United States Patent
Shadwell et al.

(10) Patent No.: US 8,763,332 B2
(45) Date of Patent: Jul. 1, 2014

(54) ROOF INSULATION FASTENING SYSTEM

(75) Inventors: Peter J. Shadwell, Longmeadow, MA (US); Tad A. Weiss, Westhampton, MA (US)

(73) Assignee: Handy & Harman, White Plains, NY (US)

( * ) Notice: Subject to any disclaimer, the term of this patent is extended or adjusted under 35 U.S.C. 154(b) by 14 days.

(21) Appl. No.: 13/186,630

(22) Filed: Jul. 20, 2011

(65) Prior Publication Data

US 2012/0017529 A1    Jan. 26, 2012

Related U.S. Application Data

(60) Provisional application No. 61/366,006, filed on Jul. 20, 2010.

(51) Int. Cl.
*E04B 5/00* (2006.01)
*F16D 33/00* (2006.01)
*F16D 43/00* (2006.01)

(52) U.S. Cl.
USPC ............... 52/410; 52/408; 52/409; 411/531; 411/533

(58) Field of Classification Search
CPC .................. E04D 5/142; E04D 5/145
USPC ........... 52/408, 409, 410, 704, 705, 707; 411/396, 480, 531, 533
See application file for complete search history.

(56) References Cited

U.S. PATENT DOCUMENTS

| | | | |
|---|---|---|---|
| 3,233,502 A * | 2/1966 | Fernberg | 411/500 |
| D204,415 S * | 4/1966 | Barry | D8/386 |
| D262,093 S * | 12/1981 | Bush et al. | D8/386 |
| 4,624,092 A | 11/1986 | Baginski | |
| 4,799,845 A | 1/1989 | Hrysko | |
| 4,862,664 A * | 9/1989 | Romine | 52/410 |
| 5,018,329 A * | 5/1991 | Hasan et al. | 52/410 |
| 5,069,589 A * | 12/1991 | Lemke | 411/533 |
| 5,082,412 A * | 1/1992 | Thomas | 411/533 |
| 5,171,118 A * | 12/1992 | Rothenbuhler | 411/480 |
| 5,217,339 A * | 6/1993 | O'Connor et al. | 411/531 |
| 5,265,998 A * | 11/1993 | Kluser | 411/480 |
| 5,378,102 A * | 1/1995 | Mossman | 411/531 |
| 5,607,272 A * | 3/1997 | Olvera et al. | 411/533 |

(Continued)

FOREIGN PATENT DOCUMENTS

EP    0600284 B1    6/1994

OTHER PUBLICATIONS

International Search Report.

*Primary Examiner* — Jeanette E Chapman
*Assistant Examiner* — James Buckle, Jr.
(74) *Attorney, Agent, or Firm* — Alix, Yale & Ristas, LLP

(57) ABSTRACT

A roof insulation fastening system employs a fastener and a compression plate with a tube which interacts with the compression plate to permit the plate to vertically move relative to the head of the fastener when the adjacent area and/or plate is subject to excessive compression. The tube includes a retainer shoulder and a pair of tabs wherein the plate captures the tube. The tube includes a throat and a tapered portion with a throughbore. The fastener is inserted into the tube and secured in place so that the head is retained at the intersection of the throat and the tapered portion and the shank is secured into the roofing substrate.

18 Claims, 27 Drawing Sheets

(56) References Cited

U.S. PATENT DOCUMENTS

| | | | |
|---|---|---|---|
| 5,626,451 A * | 5/1997 | Seibert | 411/533 |
| 5,636,953 A | 6/1997 | Jaeger et al. | |
| 5,660,015 A * | 8/1997 | Kluser | 52/410 |
| 5,688,092 A * | 11/1997 | Olvera et al. | 411/533 |
| 5,772,381 A * | 6/1998 | Olvera et al. | 411/533 |
| 6,095,737 A * | 8/2000 | Barker et al. | 411/359 |
| 6,308,483 B1 * | 10/2001 | Romine | 52/410 |
| 6,425,720 B1 * | 7/2002 | Kramer | 411/533 |
| 6,558,098 B1 * | 5/2003 | Angehrn et al. | 411/533 |
| 7,631,468 B2 * | 12/2009 | Gong et al. | 52/410 |
| 7,779,592 B2 * | 8/2010 | Bernardi et al. | 52/463 |
| 8,166,720 B2 * | 5/2012 | Garrigus et al. | 52/410 |
| 2004/0148888 A1 * | 8/2004 | Kuhn et al. | 52/410 |
| 2004/0187420 A1 * | 9/2004 | Bernardi et al. | 52/410 |
| 2005/0166503 A1 * | 8/2005 | Panasik | 52/408 |
| 2006/0185289 A1 * | 8/2006 | Gong et al. | 52/410 |
| 2007/0107347 A1 * | 5/2007 | Haynes et al. | 52/410 |
| 2009/0173028 A1 * | 7/2009 | Garrigus et al. | 52/410 |
| 2010/0031595 A1 * | 2/2010 | Kelly | 52/408 |
| 2011/0192941 A1 * | 8/2011 | Lalancette et al. | 248/70 |

* cited by examiner

ROOF INSULATION FASTENING SYSTEM

CROSS-REFERENCE TO RELATED APPLICATION

This application claims the priority of U.S. Provisional Patent Application No. 61/366,006 filed on Jul. 20, 2010, the disclosure of which is incorporated by reference in its entirety.

BACKGROUND

This disclosure relates generally to fasteners and fastener assemblies which are employed for securing roof insulation to a roof deck. More particularly, this disclosure relates to fastening assemblies which employ a metal plate to secure an overlying membrane and insulation to a roof deck.

In roof installations for which the present disclosure has particular applicability, battens or rolls of insulation are laid across a roof deck. A water-impermeable membrane is laid on top of the insulation. Metal plates clamp the membrane and insulation to the roof deck by means of fasteners which are inserted through central openings of the plates and threaded into the roof deck.

For some installations, which employ relatively thick insulation that is highly compressible, it is common to insert a tube into the central opening of the metal plate. The fastener is inserted into the tube. The underside of the head of the fastener engages an interior shoulder of the tube. The fastener is then driven into the roof deck so that the plate clamps against the membrane and insulation. The tube is vertically displaceable relative to the secured fastener. The plate can thus vertically move relative to the head of the threaded fastener when the adjacent area and/or plate is subject to excessive compression.

For some applications, the plate may also be affixed with a heat-activated adhesive. A water impermeable membrane covers the plates. An induction tool is passed over the plate to heat the adhesive which bonds with the membrane overlying the plate.

SUMMARY

Briefly stated, a fastening assembly for securing a membrane and insulation to a roof deck comprises a fastener, a compression plate and a clamp tube. The fastener has a drive head and a threaded shank extending from the drive head. The compression plate distributes the load of the fastener across the upper surface of the membrane and defines a central opening. The clamp tube has a retainer collar, a throat and a tapered portion with a fastener opening through which the shank extends. The fastener shank is inserted through the central opening so that the retainer collar engages the plate and is captured thereby. The tapered portion is traversed by at least one slot and preferably by a plurality of angularly disposed slots. The plate has an underside which preferably engages the membrane.

The clamp tube further comprises a retainer tab for engaging the underside of the plate. The tube preferably further comprises a second retainer tab opposite the first retainer tab for engaging the underside of the plate. A shoulder, which may have an annular form, is defined in an interior location adjacent the introduction of the tube adjacent the intersection of the throat and the tapered portion.

In one embodiment, the compression plate further comprises a plurality of angularly spaced prongs which surround the central opening. The prongs surround and resiliently engage against the throat at a peripheral exterior portion adjacent the retainer collar. The tube further comprises a pair of opposed tabs and at least two of the prongs engage against the retainer tabs.

A one-piece tube is seatable in a compression plate for receiving a fastener. The tube includes a circumferential retaining flange. A sleeve integrally extends from the flange and has a pair of tabs with shoulders spaced from the underside of the flange. The tabs have a peripheral ramp surface. The sleeve further defines a cutout adjacent each of the tabs. The sleeve interiorly forms a throat with an interior shoulder adapted for engagement by the fastener head. A tapered portion integrally extends from the sleeve and tapers toward a distal tip. A throughbore extends from the throat and is dimensioned for receiving the shank of the fastener. A plurality of angularly spaced slots extends to the tip to permit limited flexure in the tapered portion. There are preferably three slots in the tapered portion of the tube. The exterior surface of a conical portion of the tapered portion is defined by a plurality of angularly spaced gussets.

A plurality of ribs project inwardly into the throughbore at the tip. The ribs preferably project inwardly and extend arcuately at the tip. In another embodiment, a plurality of angularly spaced ribs extend longitudinally interiorly of the sleeve. A recess for receiving the head is defined at an interior location adjacent the intersection of the throat and the tapered portion. The tube is preferably manufactured from a plastic material.

A roof installation comprises a roof deck insulation disposed on the roof deck and a membrane overlying the insulation. A compression plate which has a central opening is disposed on the upper surface of the membrane. A clamp tube having a retainer collar, a throat and a tapered portion with a fastener opening is captured by the plate. A fastener which has a drive head and a threaded shank extends from the drive head. The fastener shank extends through the fastener opening and engages with the deck. The retainer collar of the tube engages the plate, and the tube is captured by the plate. The tube and plate are displaceable as a unit from a first position under a compressive load and return to the first position as a unit when the compressive load is removed while the fastener remains engaged with the deck.

The plate has an underside which engages the membrane and the clamp tube further comprises a pair of opposed retainer tabs for engaging the underside of the plate. The tapered portion is traversed by a plurality of angularly disposed slots. A shoulder defined by an interior location of the tube adjacent the intersection of the throat and the tapered portion is positioned so that the fastener head is seated against the shoulder. The compression plate further comprises a recessed portion surrounding the central opening and the retainer collar is received in the recess portion.

DETAILED DESCRIPTION

Figure 1:
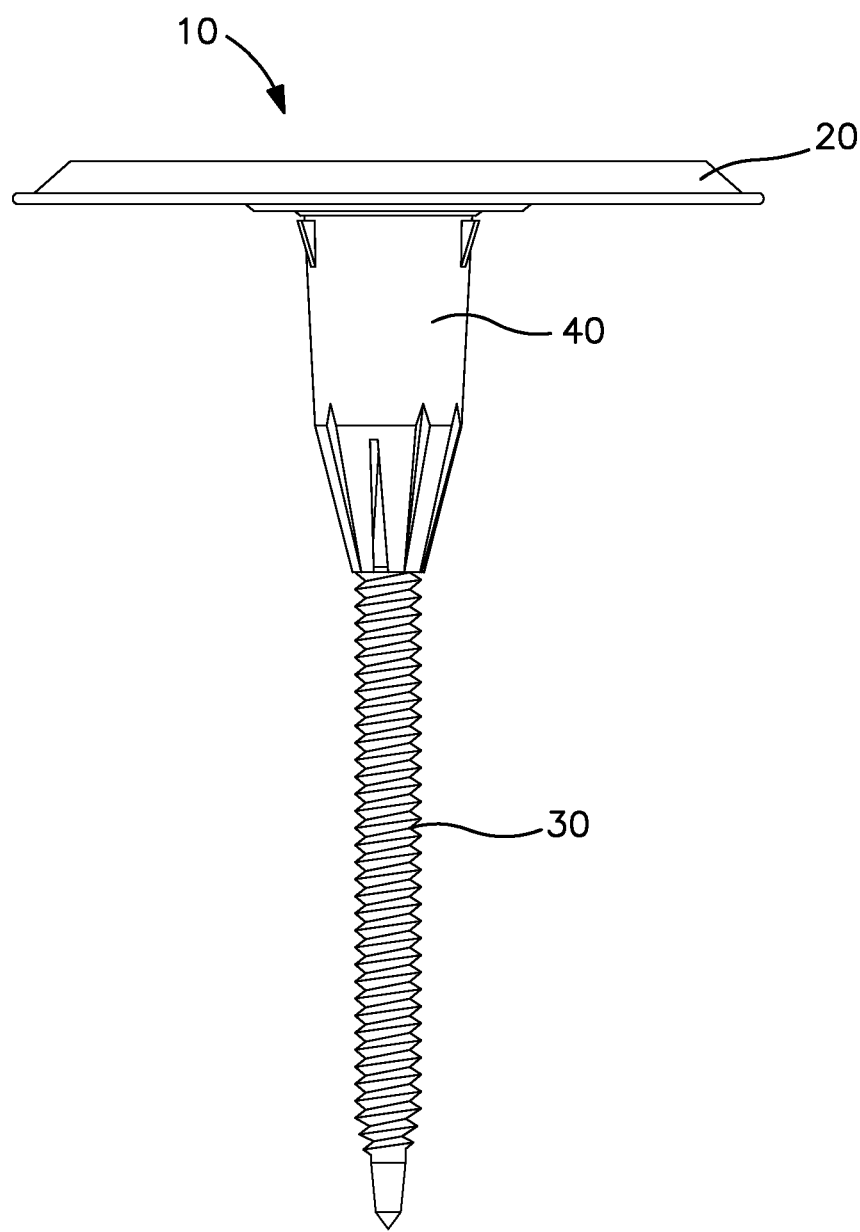
FIG. 1 is a side elevational view of an assembled fastening assembly including a plate, a tube and a fastener.
Figure 2:
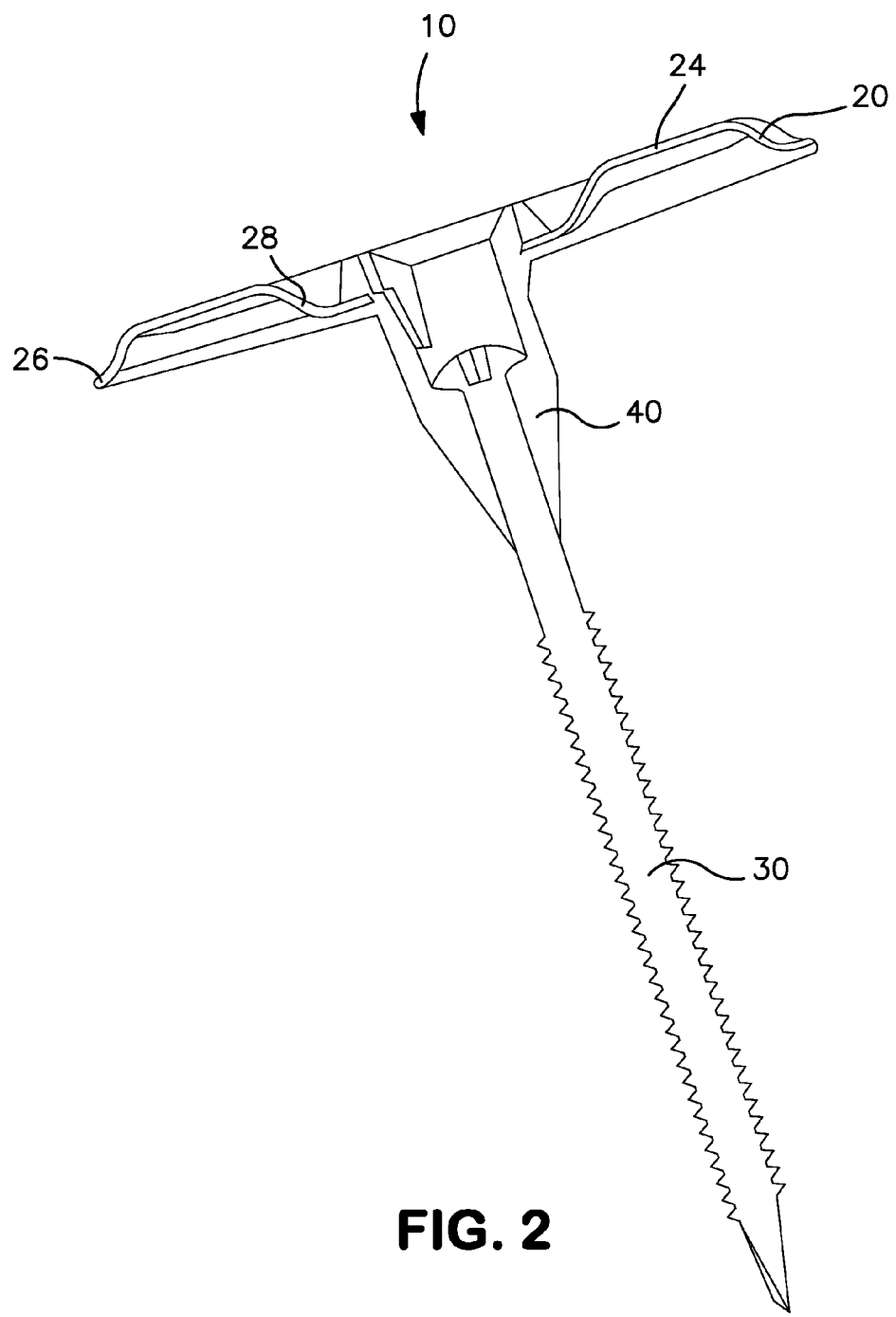
FIG. 2 is a central sectional view of the fastening assembly of FIG. 1.
Figure 3:
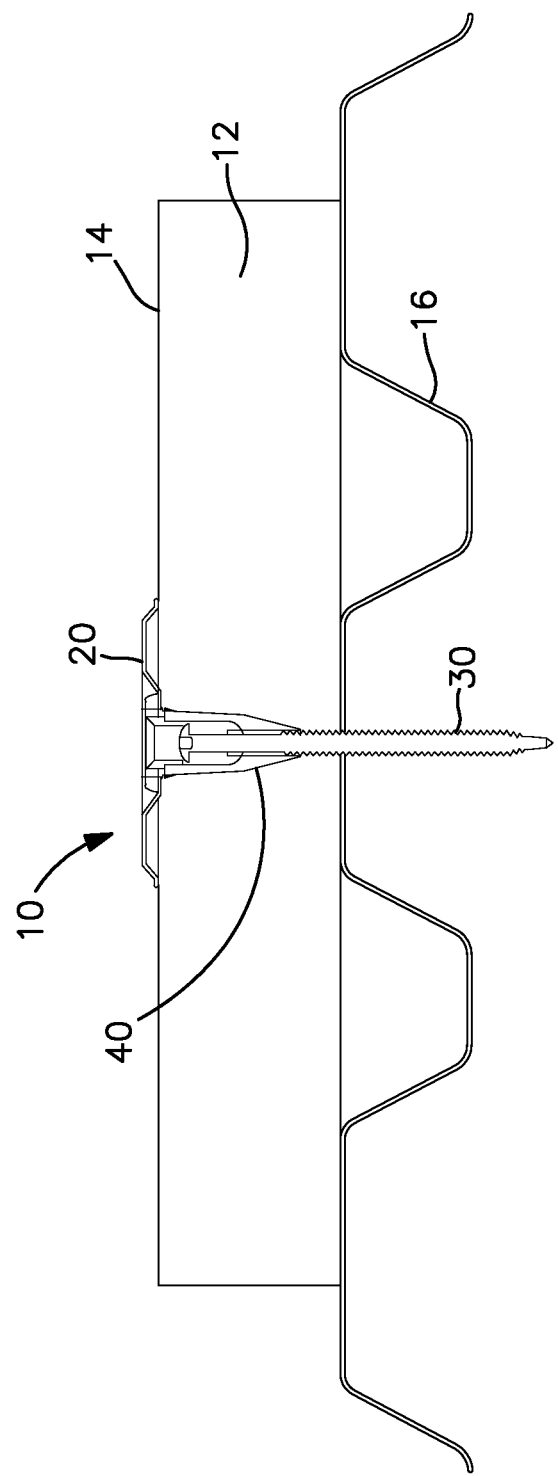
FIG. 3 is a sectional view of the fastening assembly of FIG. 1 as installed in a roof installation shown in section for securing insulation to a roof deck.
Figure 4:
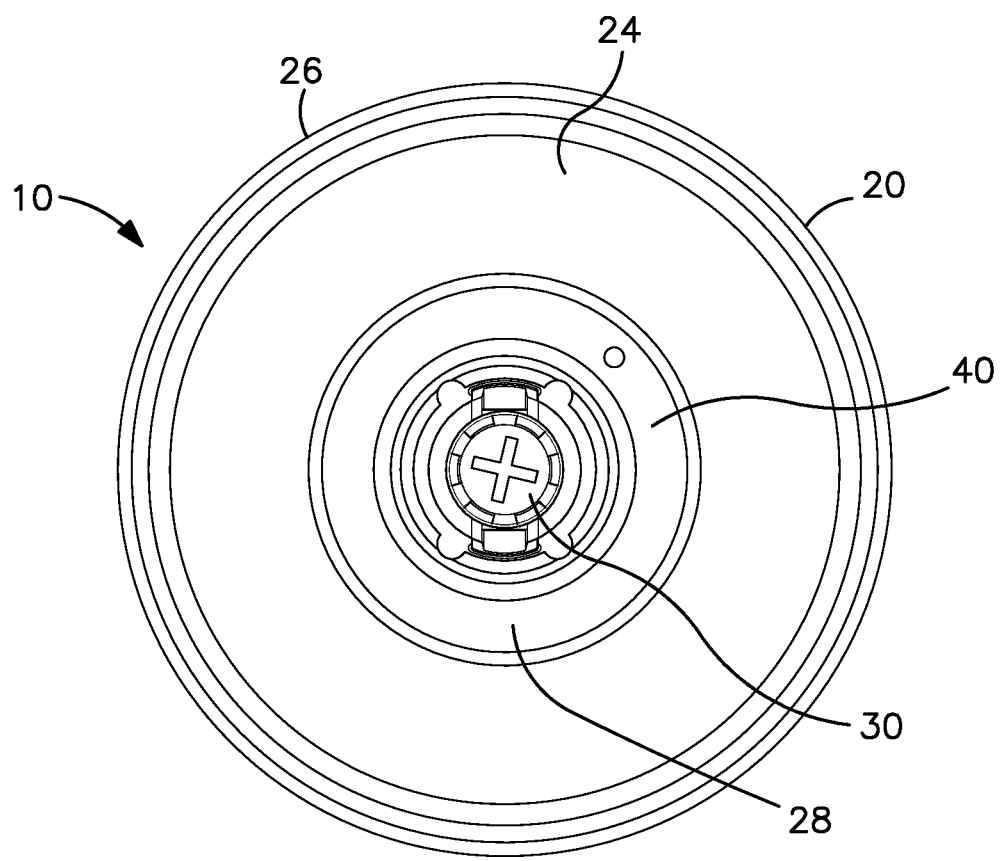
FIG. 4 is a top plan view of a plate, a tube and a fastener for the fastening assembly of FIG. 1.
Figure 5:
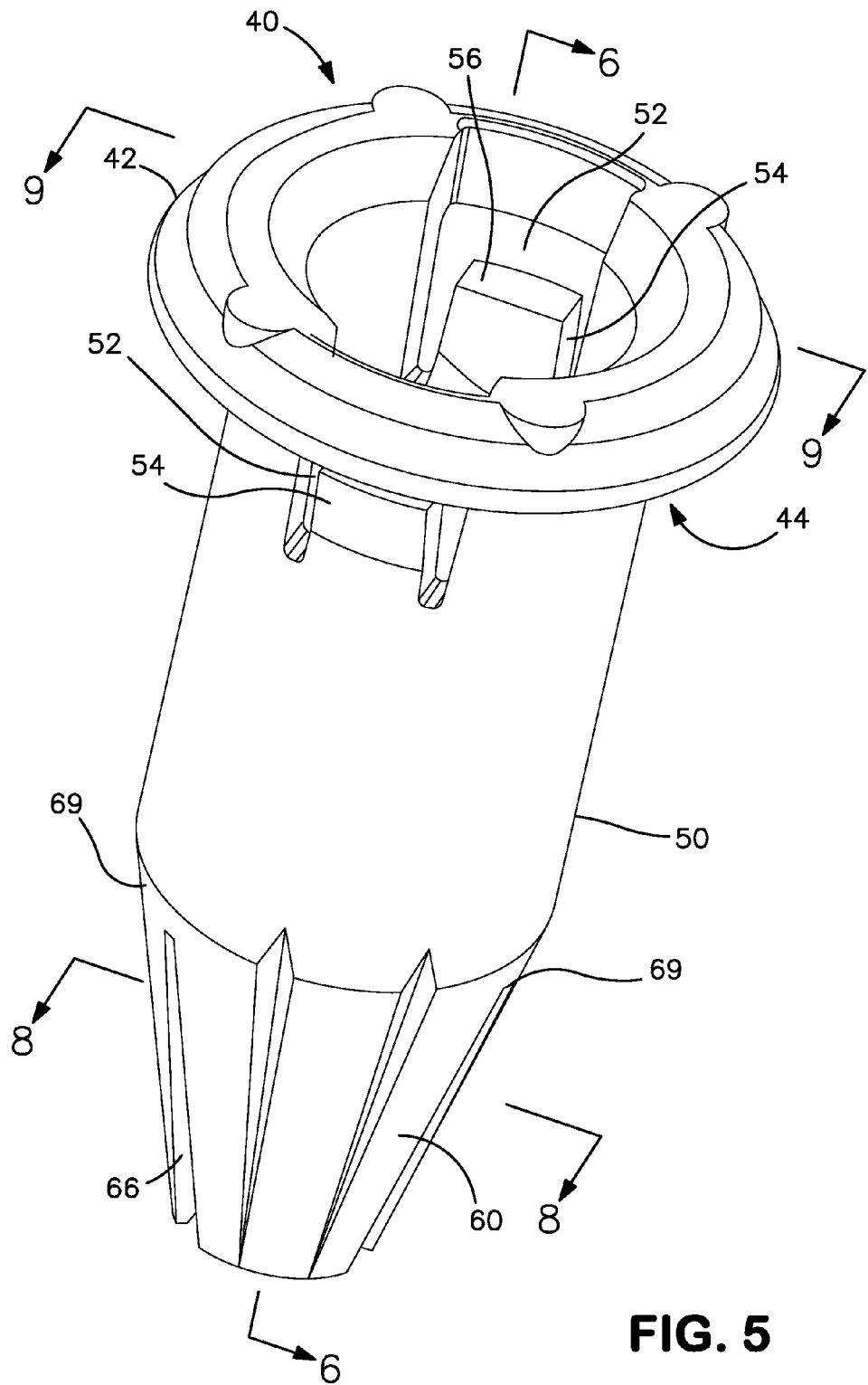
FIG. 5 is an enlarged perspective view of a tube which may be employed in the fastening assembly of FIG. 1.
Figure 6:
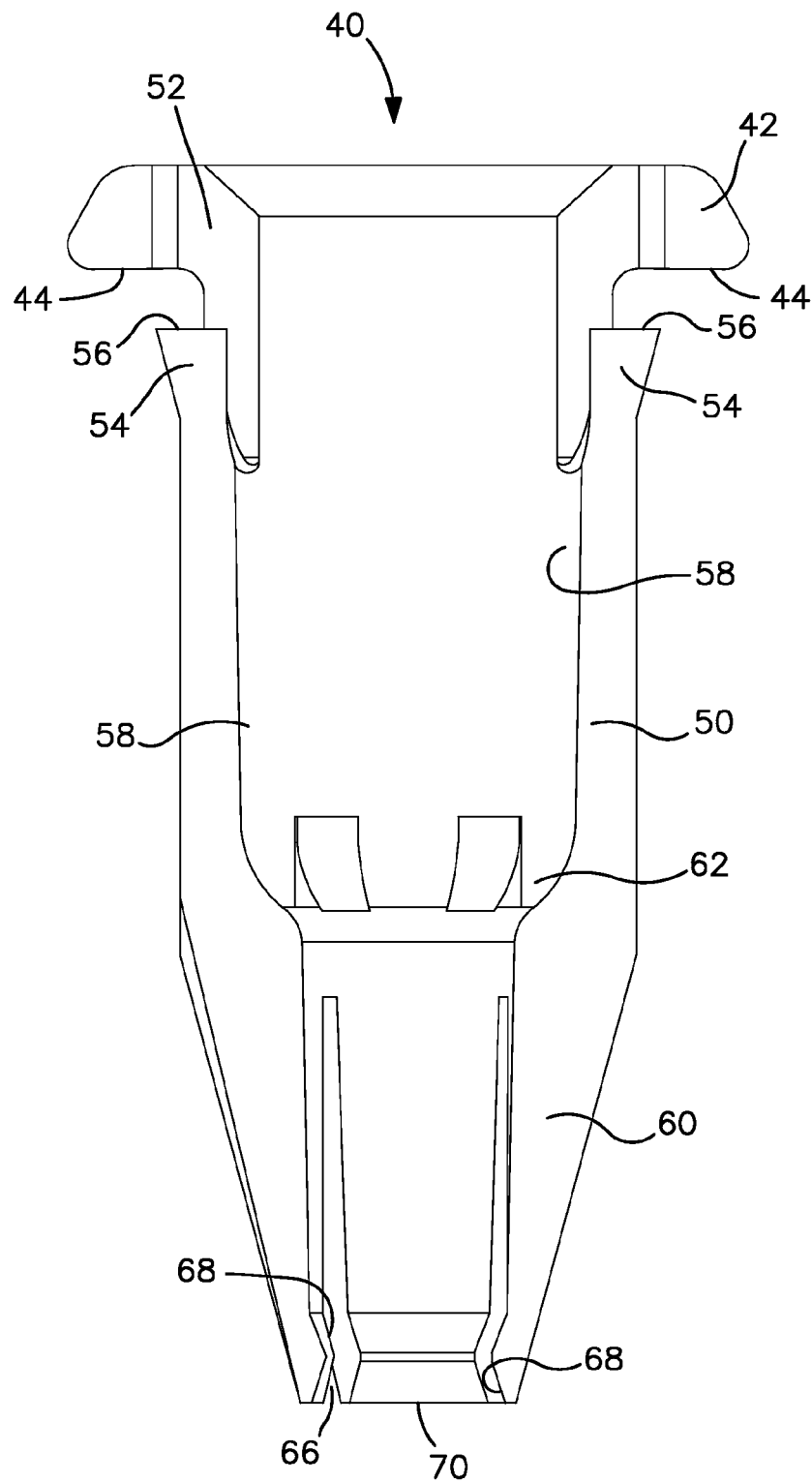
FIG. 6 is a central sectional view of the tube of FIG. 5, taken along line 6-6 thereof.
Figure 7:
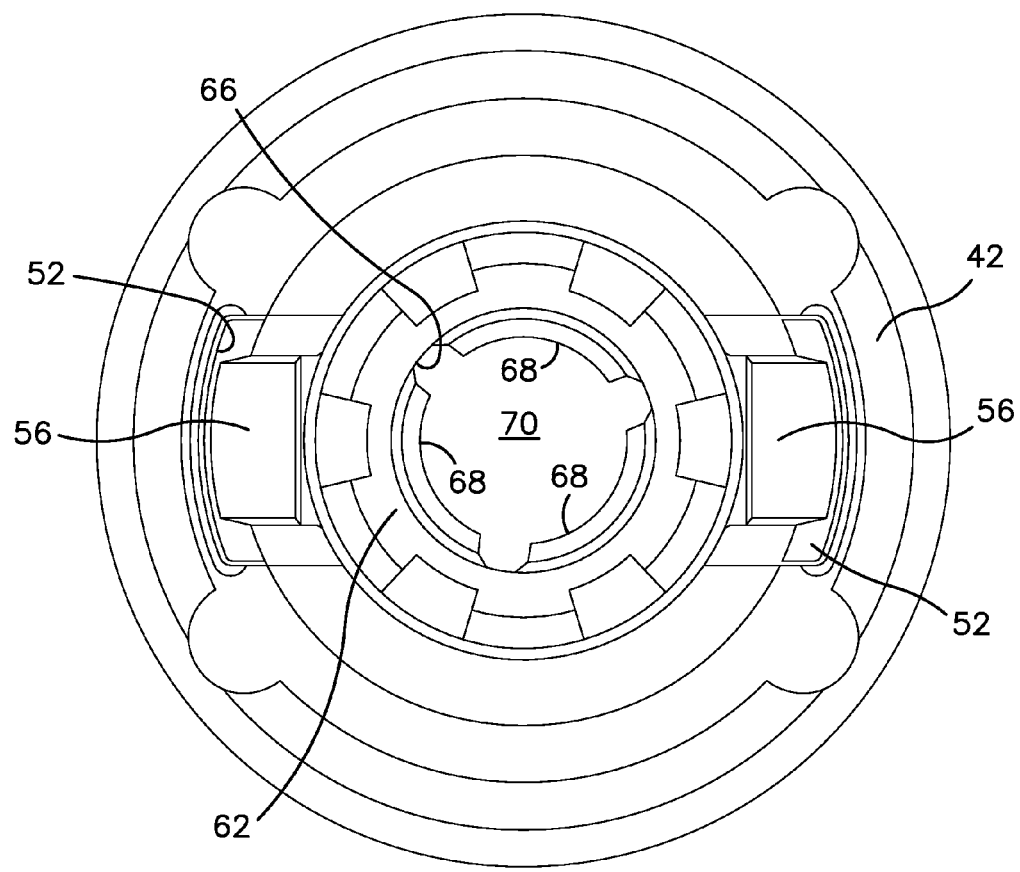
FIG. 7 is a top plan view of the tube of FIG. 5.
Figure 8:
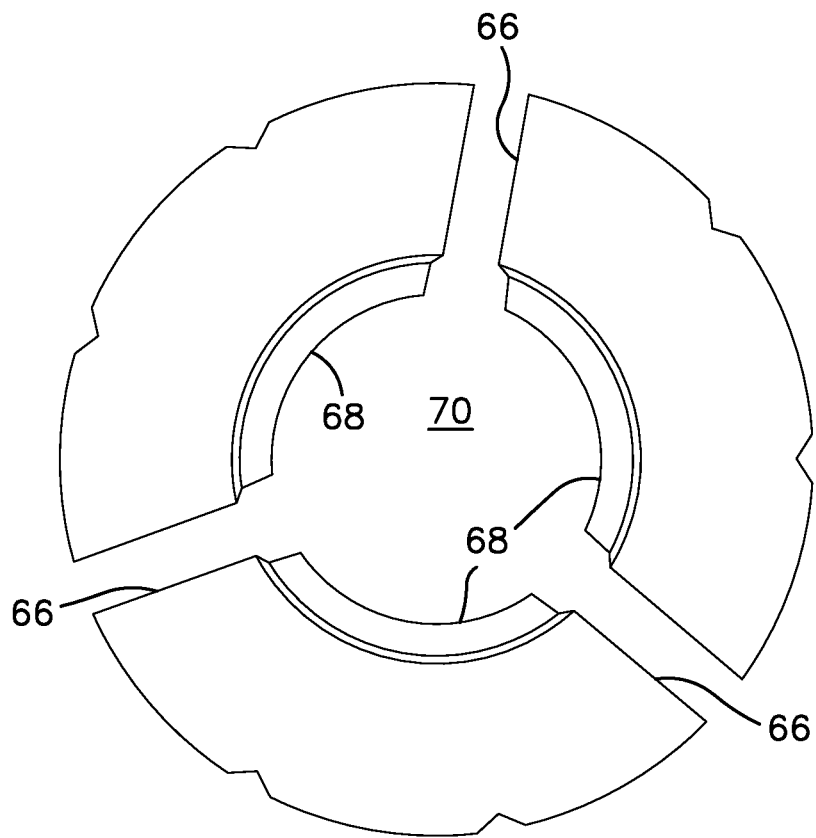
FIG. 8 is a cross-sectional view of the tube of FIG. 5, taken along line 8-8 thereof.
Figure 9:
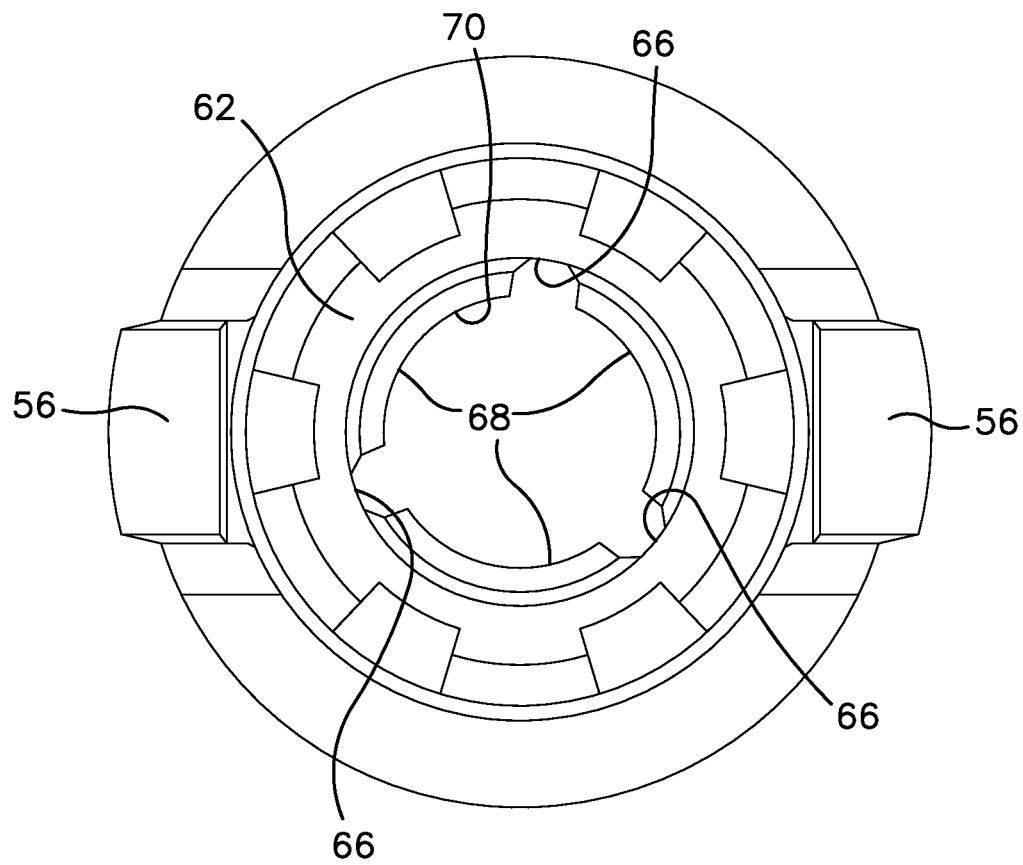
FIG. 9 is a cross-sectional view of the tube of FIG. 5, taken along line 9-9 thereof.
Figure 10:
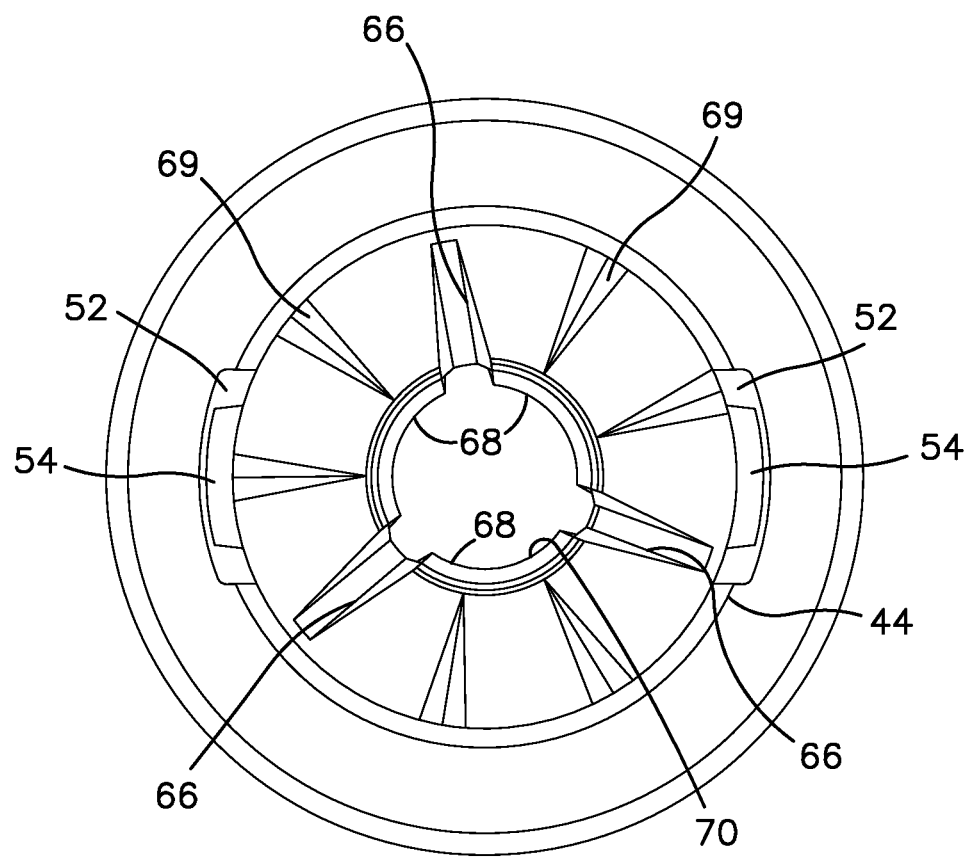
FIG. 10 is a bottom plan view of the tube of FIG. 6.
Figure 11:
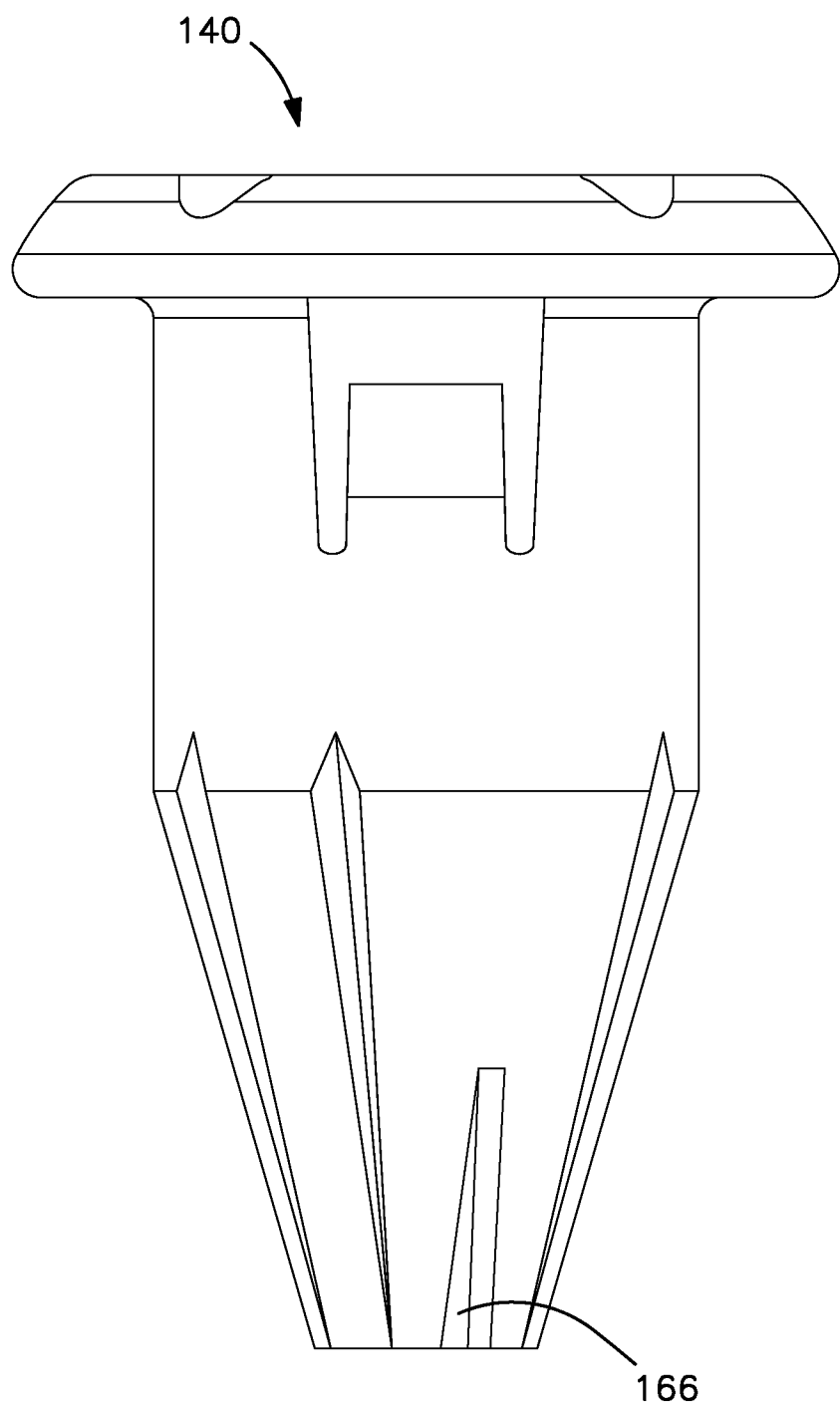
FIG. 11 is an enlarged side elevational view of another embodiment of a tube which may be employed for the fastening system of FIG. 1.

With reference to the drawings wherein like numerals represent like parts throughout the several figures, a fastening assembly designated generally by the numeral 10 is employed to secure insulation 12 and a water impermeable membrane 14 to a roof deck 16 and to maintain the connection between the membrane and the roof deck. In the illustrated installation of FIG. 3, the roof deck 16 has a corrugated steel form, and the insulation 12 is typically a highly compressible insulation which may have a thickness which varies, for example, from 8 to 12 inches.

In installations for which the fastening assembly 10 has particular application, battens or rolls of the insulation are laid onto the roof deck. The roof is typically a "flat" type of roof. A membrane covers the insulation. The fastening assembly 10 functions to clamp the membrane and the insulation onto the roof deck to secure same therewith. Naturally, numerous such fastening assemblies are employed for a given installation and typically form a grid across the roof.

The fastening assembly comprises a plate 20, a fastener 30 which is driven into the roof deck to provide the securing/clamping function, and a tube 40 which is inserted into the plate and receives fastener 30 which is inserted into the tube. The foregoing three components may be pre-assembled.

Figure 16:
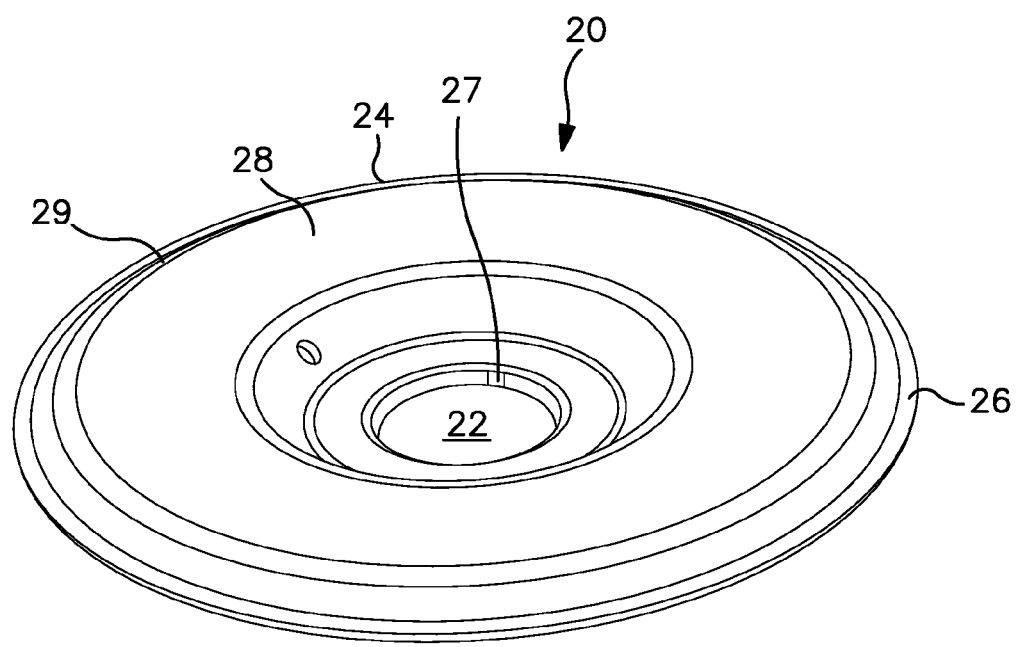
FIG. 16 is an enlarged perspective view of a plate for the fastening assembly of FIG. 1.
Figure 17:
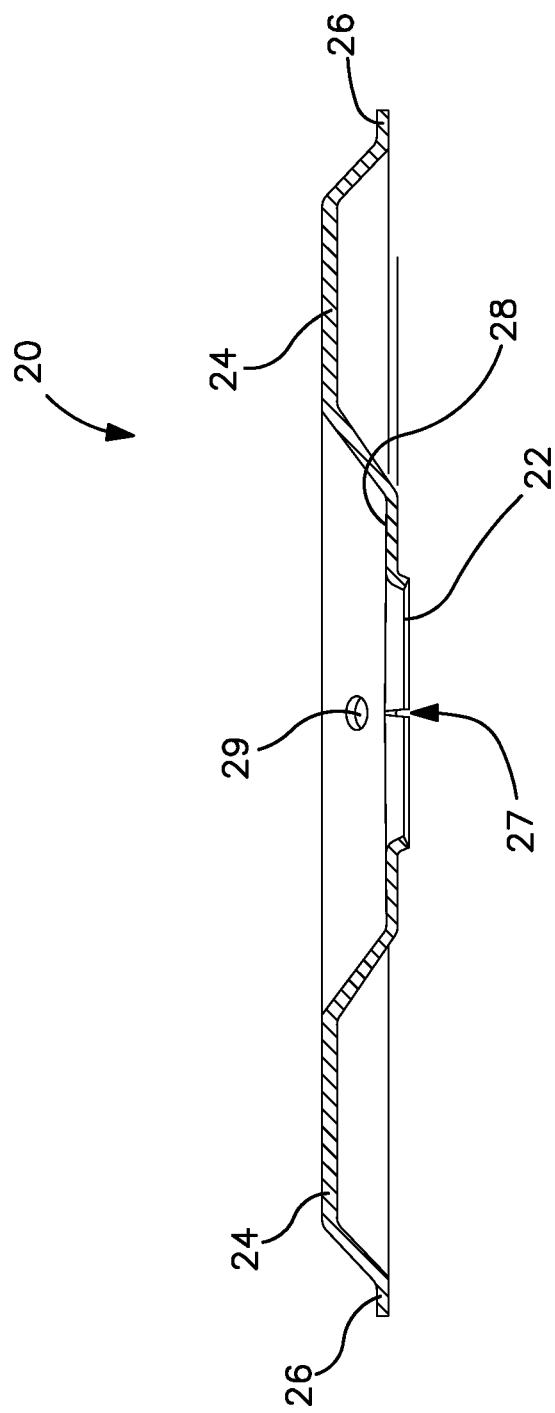
FIG. 17 is an enlarged central sectional view, partly in diagram form, of the plate of FIG. 16.

With additional reference to FIGS. 16-17, the plate 20 is typically made from galvanized steel or other metal and formed by a stamping process. The plate 20 typically has a stepped circular shape with a central circular opening 22 and a raised annular platform 24. The plate includes an outer peripheral lower annular rim 26 and an inner stepped recess 28 which surrounds the opening 22 and tapers downwardly in two steps from the raised platform 24. One or more stress cuts 27 may be formed in the plate portion defining the recess around the opening. For some embodiments, heat-activated adhesive (not illustrated) may be applied to the platform 24 for sealing and securing an overlying membrane. The plate 20 may also include a vent opening 29.

The tube 40 is an integral, one-piece plastic member. The tube 40 is preferably formed from polyamide with 0 to 15% glass filler and 0 to 3% impact modifier or polypropylene with 0 to 20% glass filler and 0 to 10% impact modifier. Other materials may also be suitable.

The tube 40 includes an annular flange-like collar 42 configured to be received in the plate recess 28. The collar underside 44 engages the plate portion defining the recess 28 surrounding the opening of the plate. The tube 40 functions to facilitate the clamping securement of the plate and in part as a relief structure to allow the installed fastening assembly to accommodate a downwardly compressive load applied at or adjacent the top of the plate without jeopardizing the integrity of the membrane and the clamp load supplied by the fastening assembly after the compressive load is relieved. The tube 40 includes a sleeve-like cylindrical throat portion 50 generally extending from the underside 44 of the collar and a quasi-conical distal tapered portion 60. The tube 40 is especially configured to be compatible with and capable of accommodating fasteners of different dimensions.

The cylindrical throat portion 50 includes a pair of opposed, inverted quasi-U-shaped cutouts 52. Each cutout surrounds a resilient tab 54 which projects upwardly. Each tab 54 has an upper shoulder 56 preferably having a top planar surface. Each tab 54 has a ramp surface 55 configured and dimensioned to slide over the edge of the plate opening 22 so that the shoulder 56 engages the underside 44 of the plate when the tube 40 is inserted through the central opening 22 and seated in the recess 28. The outside diameter of the cylindrical throat portion 50 is generally dimensioned to be closely received in the opening 22 of the plate so that the collar 42 is seated in the recess 28, and the opposed tab shoulders 56 engage the underside 44 of the plate whereby the tube may be vertically captured by the plate. The inner diameter of the inner cylindrical surface 58 of the throat portion is dimensioned so that the head 32 of the fastener 30 may be easily passed until the underside 33 of the fastener head 32 engages against an intermediate shoulder 62 or annular restriction formed at the bottom of the throat portion.

The tapered portion 60 includes an upper interior annular recess region at the interface with the throat portion 50. The tapered portion 60 is configured so that the effective inside diameter is variable as a function of the thread/shank diameter of the associated fastener 30. The tapered portion in a first mode is dimensioned to be approximately the outside diameter of a fastener having a first diameter. The axial end of the tapered portion includes an opening 70 through which the tip and end portion of the shank of the fastener passes. Angularly spaced vertical slots 66 are formed at the end of the tapered portion. The slots 66 function to allow the tapered portion to flex generally radially to accommodate fasteners with different diameters.

In addition, inwardly protruding crush ribs 68 are effectively displaced radially and/or at least partially destroyed when a larger diameter fastener is driven into the tube. Naturally, the tapered portion 60 has an effective fastener diameter range and has a limit for effectively accommodating fasteners of a given diameter.

The conical portion is traversed by angularly spaced gusset grooves 69 to provide reinforcement for the tube. The tapering and geometry of the tube facilitates the insertion of the tube into the insulation and the membrane.

Figure 18:
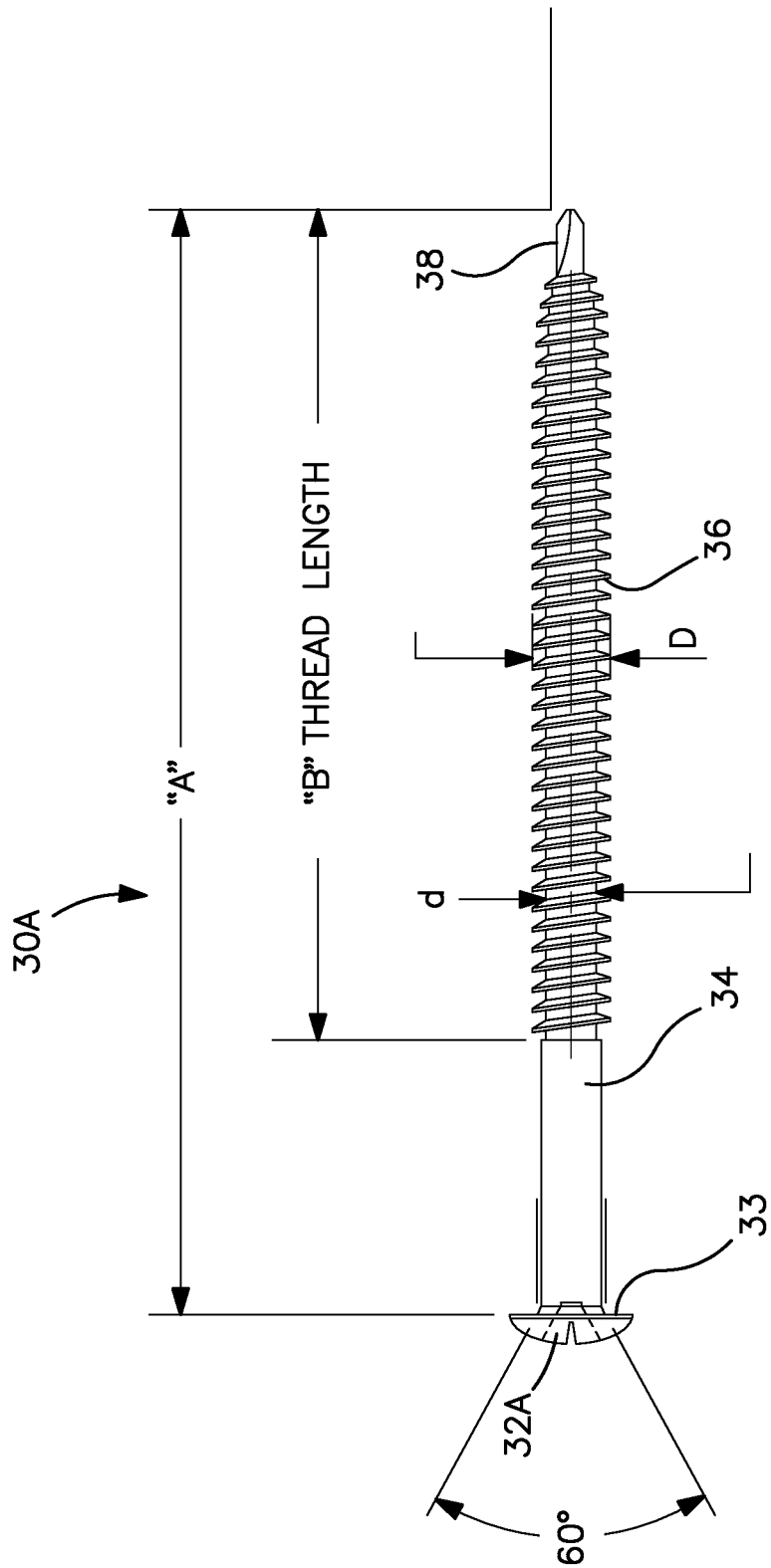
FIG. 18 is an enlarged side view, partly in diagram form, of a fastener that may be employed in the fastening assembly of FIG. 1.
Figure 19:
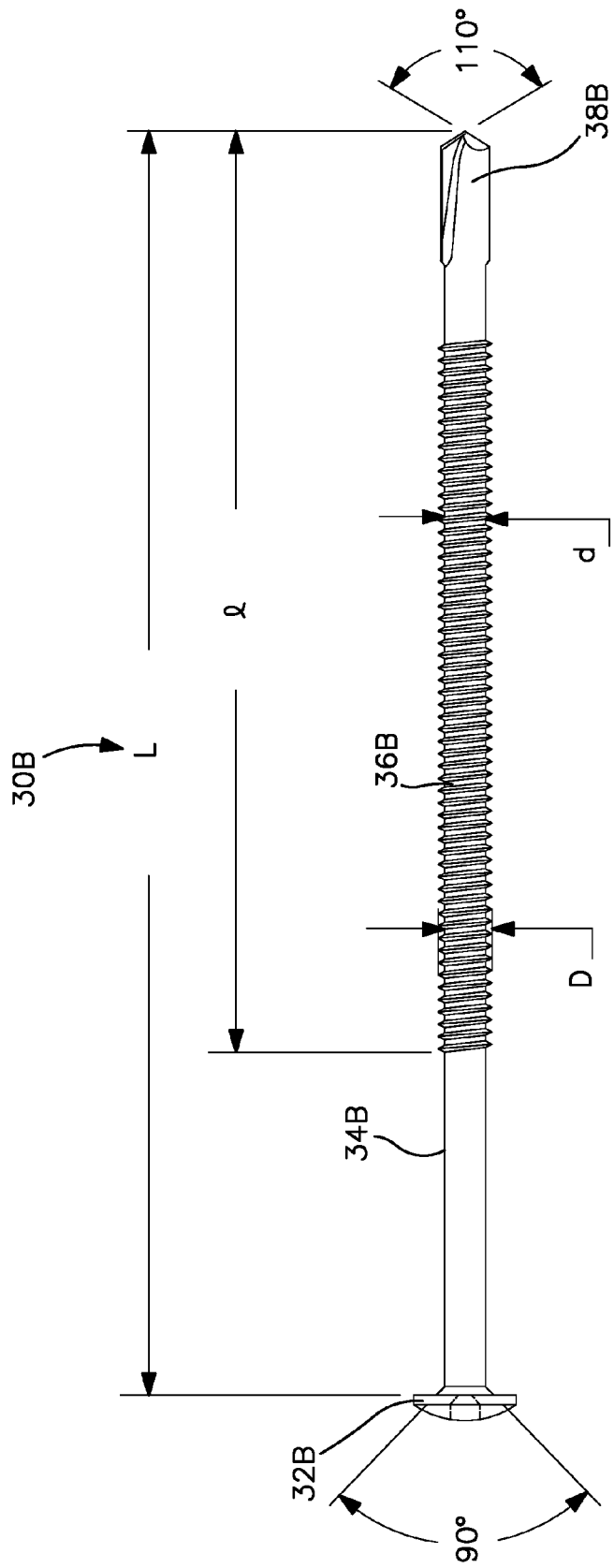
FIG. 19 is a side view, partly in diagram form, of a second fastener that may be employed in the fastening assembly of FIG. 1.

The fastener 30 includes a head 32 with a hex head, a Phillips-type slot, a square drive recess or other configuration adapted for engagement by a driving tool for torquably driving the fastener. The shank 34 of the fastener includes a thread 36 which may be a buttress thread and terminates in a drill tip 38. Two suitable fasteners 30A and 30B are illustrated in FIGS. 18 and 19, respectively. Other fasteners are also possible.

With reference to FIG. 18, fastener 30A is a #15 RoofGrip™ fastener marketed by OMG, Inc. of Agawam, Mass. The head 32A has a #3 Phillips recess. The major diameter D of the thread 36 is 0.250 to 0.275 inches and the minor diameter d of the thread is 0.165 to 0.175 inches. The thread 36A is a buttress thread having a pitch of 13 TPI. The shaft length A may vary from 1¼ to 22 inches and the thread 36B length B (including the drill tip 38A) may vary from 1¼ to 4 inches.

Another suitable embodiment for the fastener is fastener 32B illustrated in FIG. 19. The fastener 30B is a RhinoBond™ heavy duty drill point fastener marketed by OMG, Inc. of Agawam, Mass. The head 32B has a #3 square drive. The thread has a major diameter of D 0.226 to 0.230 inches and a minor diameter d of 0.175 inches. The thread 36B is a single lead thread with a pitch of 20 TPI and is a type AB thread. The drill tip 38B is a ¾ inch drill tip with a nominal diameter N of 0.208 to 0.212 inches. The shaft length L varies from 4 inches to 10 inches and the thread length Λ (including the drill tip 38B) is approximately 3.860 inches.

With reference to FIGS. 11-15, the tube may assume a number of alternative forms. Tube 140 illustrated in FIGS. 11, 14 and 15 has a shorter axial dimension. Four slots 166 are employed. The crush rib 168 structure is employed at the intermediate interior.

Figure 12:
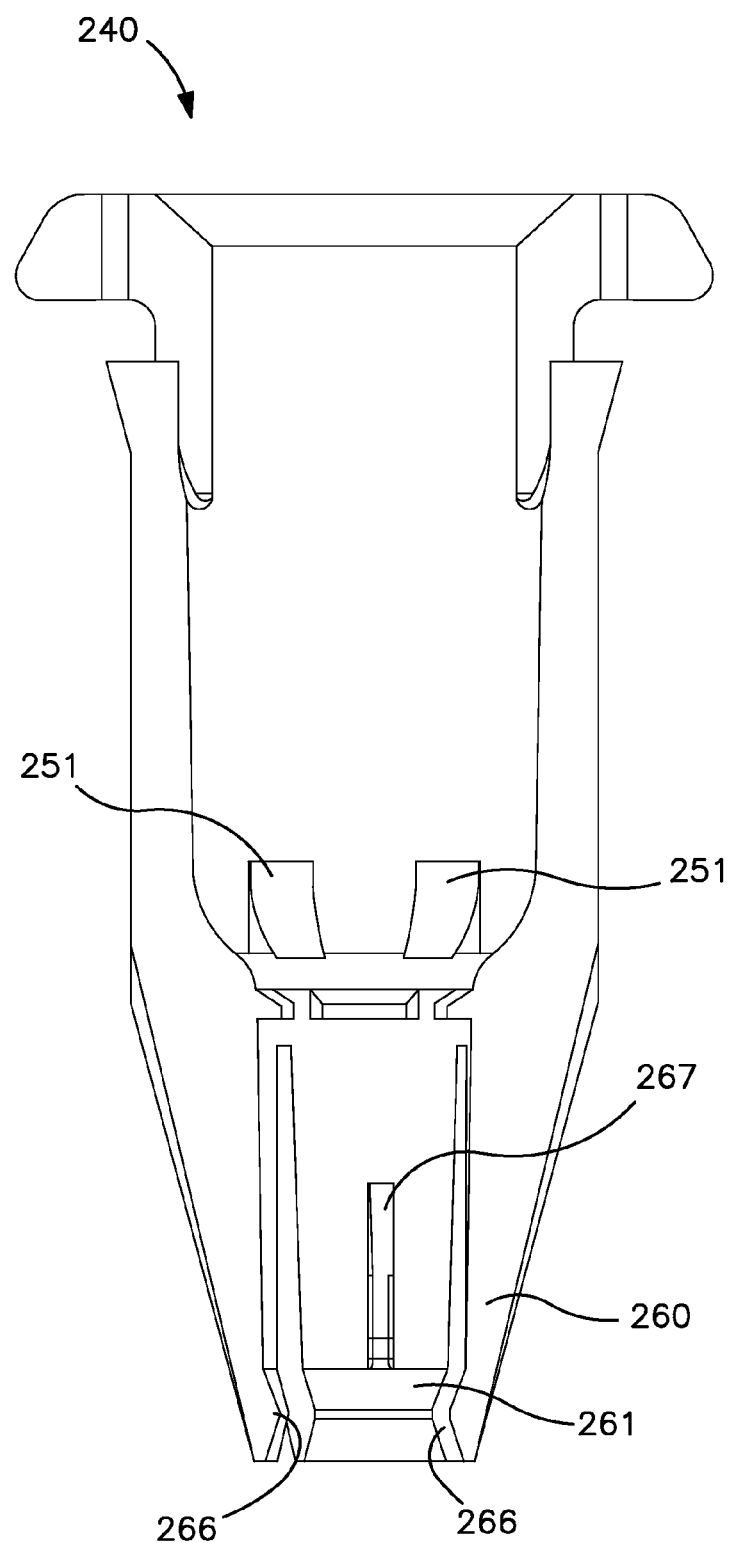
FIG. 12 is a central sectional view of a second alternate embodiment of a tube.

Tube 240 illustrated in FIG. 12 employs horizontal crush ribs 265 at or slightly below the cylindrical/tapered portion interface and longitudinally tapered and extending crush ribs 267 at the interior of the tapered portion 260 of the tube. The interior wall at the distal end of the tapered portion includes a dual conical surface 261. An additional set of inwardly tapered ribs 266 are engageable into the surface 261 in a first position for one diameter and are forced away from the surface for a second diameter. The horizontal crush ribs 265 tend to deflect and engage the minor diametral surface of the fastener in a friction type fit. The longitudinal ribs 267 and, to some extent, ribs 261, tend to be damaged and/or sheared off by the fastener. The interior of the throat prior to the restriction may also include tapered surfaces 251 to accommodate the multi-dimensioned fasteners.

Figure 13:
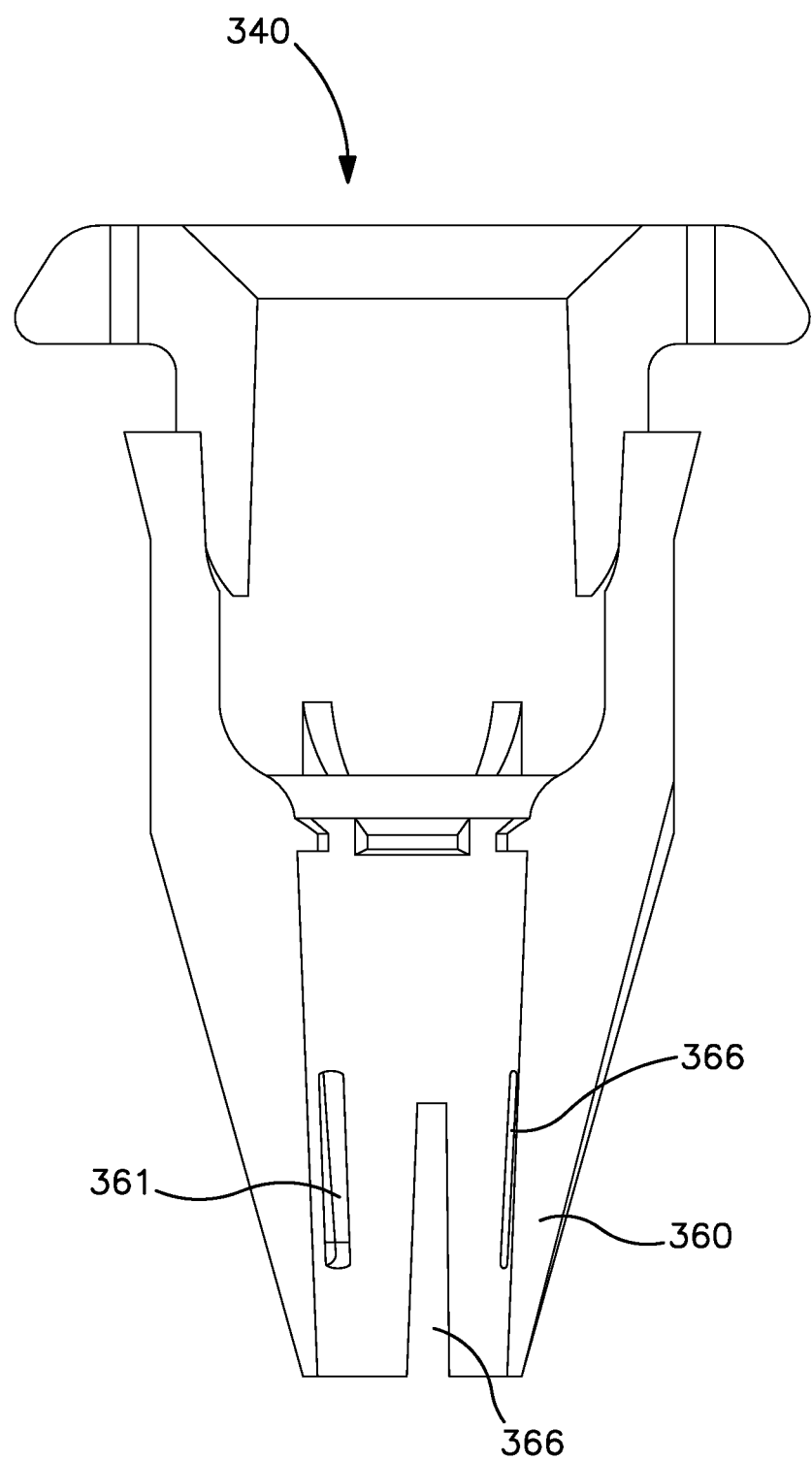
FIG. 13 is a central sectional view of a third alternate embodiment of a tube.
Figure 14:
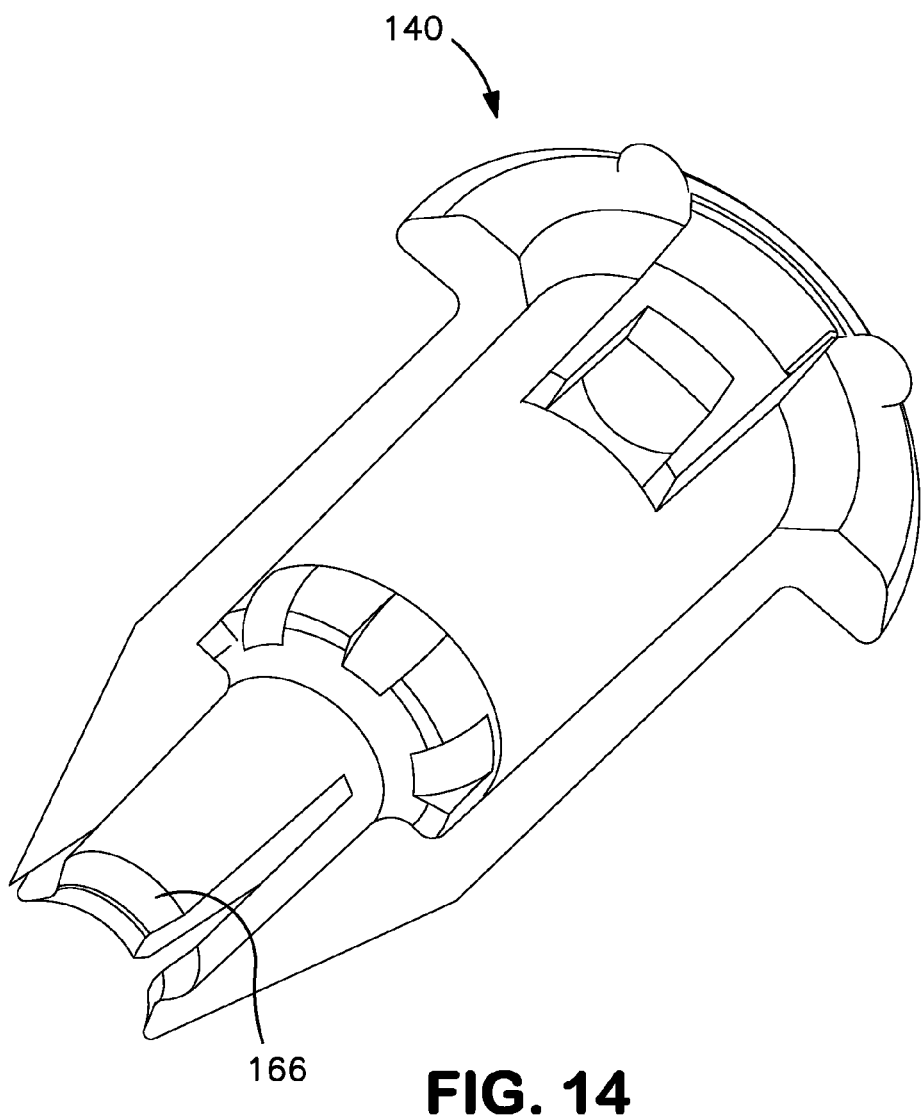
FIG. 14 is a perspective half-sectional view of the tube of FIG. 11.
Figure 15:
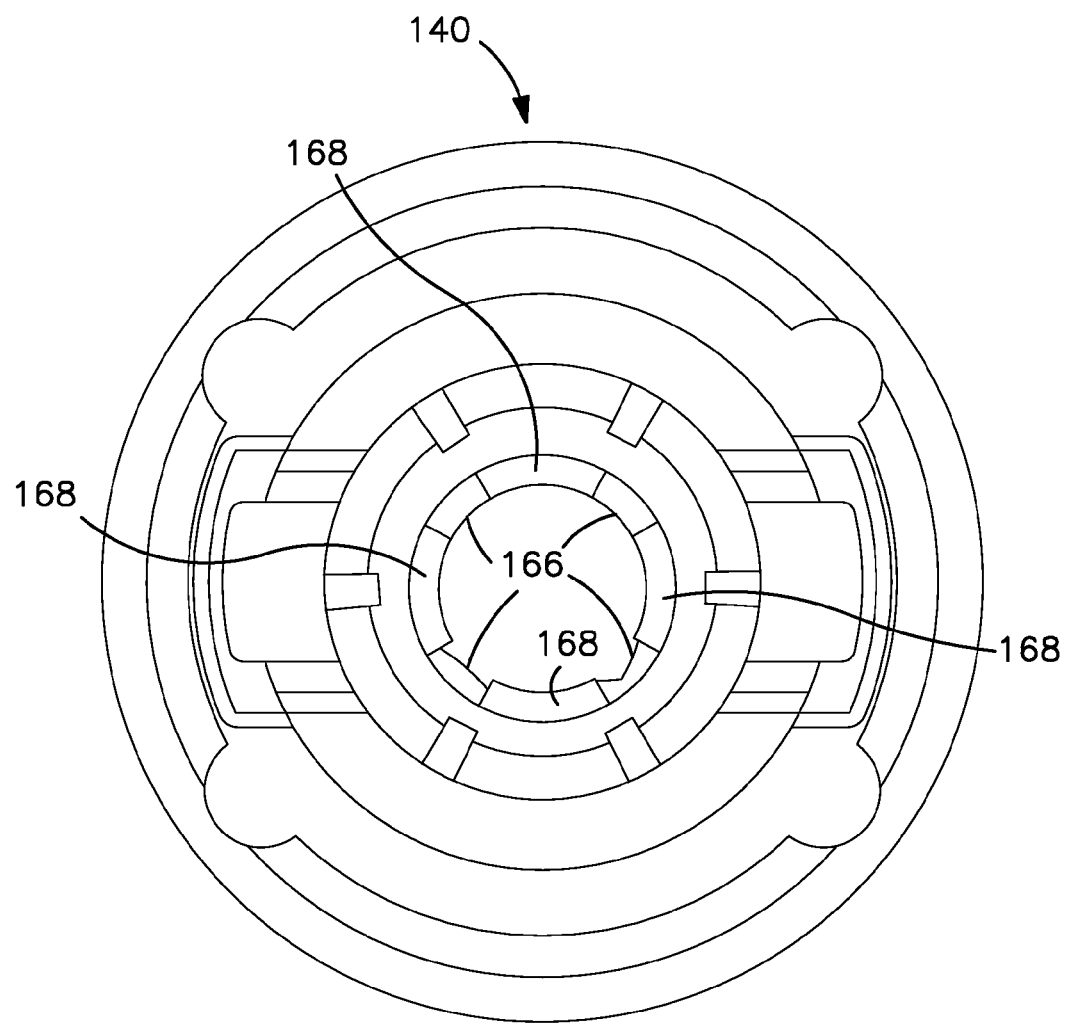
FIG. 15 is a top plan view of the tube of FIG. 11.

Tube 340 illustrated in FIG. 13 employs inwardly extending axial ribs 361 adjacent the terminal end of the tapered portion. The ribs cause the exterior tapered portion 360 of the tube to flex outwardly if a larger diameter fastener is employed. Four slots 366 are employed to allow for the terminal tube flexure to accommodate the enlarged diameter fastener.

Figure 25:
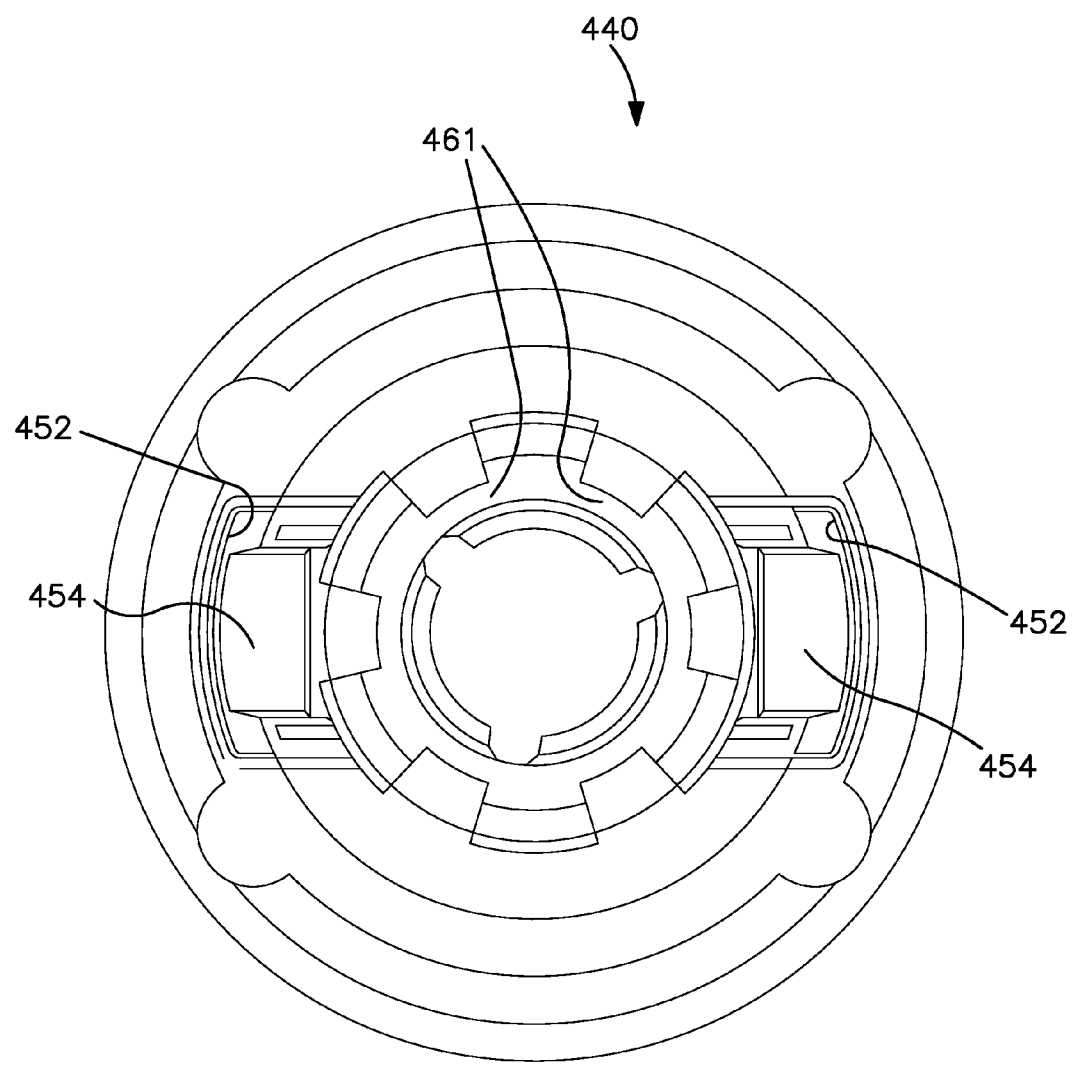
FIG. 25 is a top plan view of an alternative embodiment of a tube which may be employed in the fastening assembly.
Figure 26:
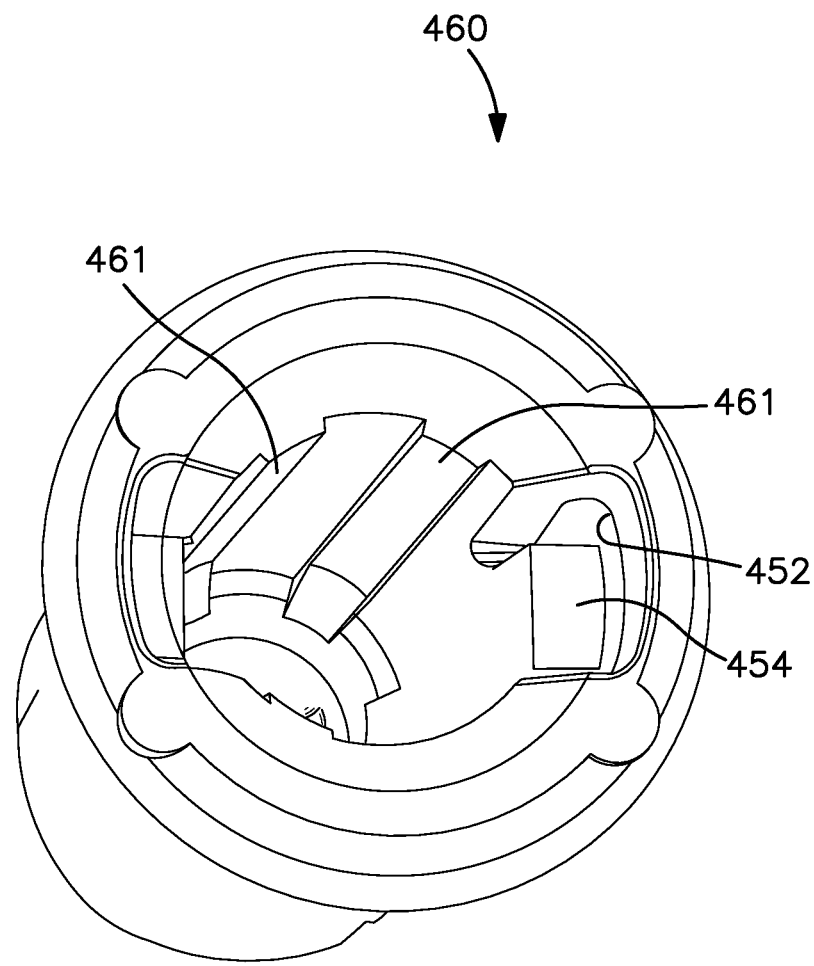
FIG. 26 is a perspective view of the tube of FIG. 25 and looking into the tube interior.
Figure 27:
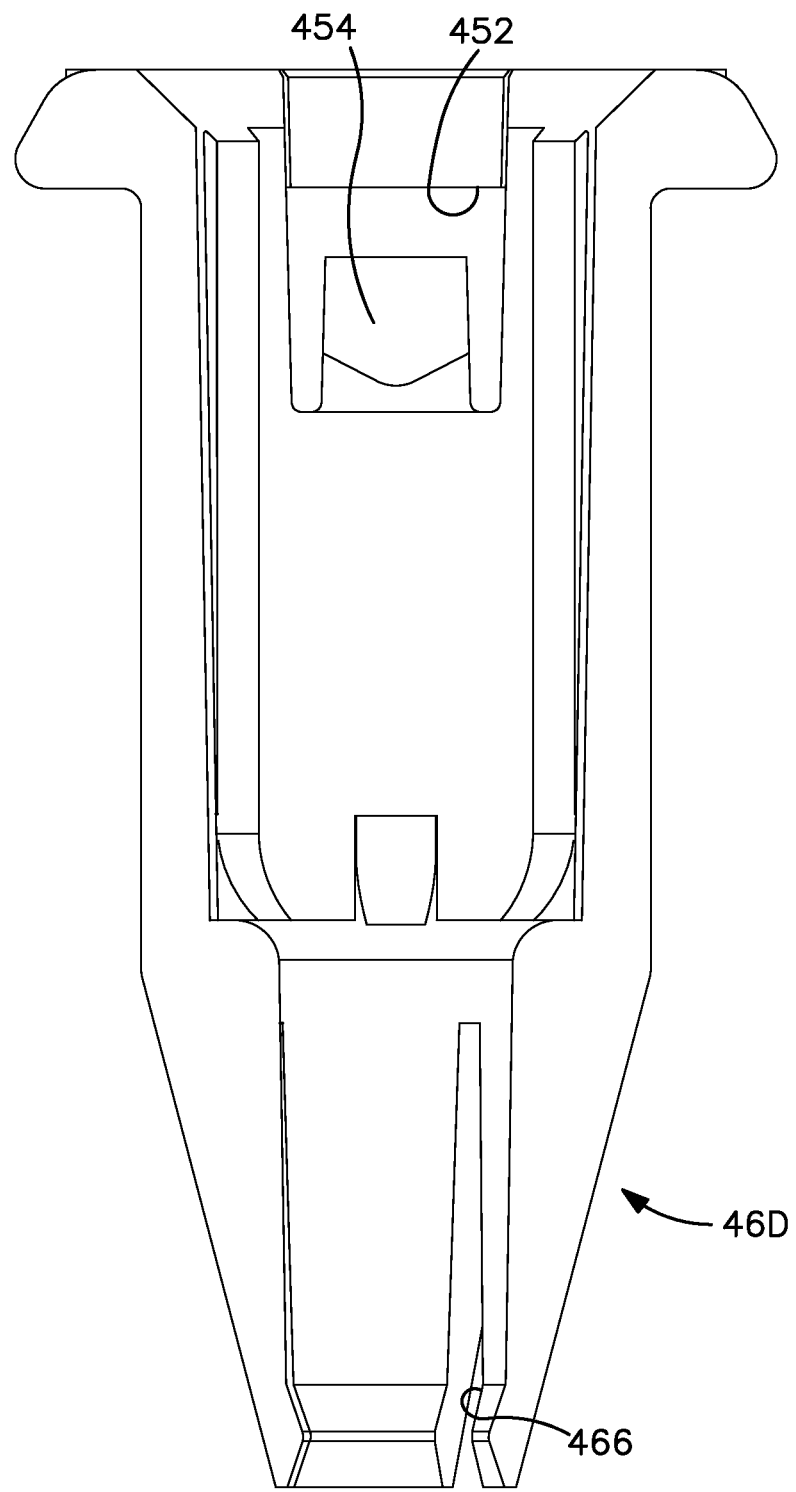
FIG. 27 is a central sectional view of the tube of FIG. 25.

With reference to FIGS. 25-27, tube 440 employs inwardly extending axial ribs 461 which extend interiorly from the upper portion of the tube and extend longitudinally to the interface with the tapered portion of the tube 460. Three slots 466 are employed to allow the terminal tube flexure to accommodate an enlarged diameter fastener. With additional reference to FIG. 25, it should be appreciated that the upper cutouts 452, which allows for the formation of the resilient tabs 454 are configured so that the tabs may be molded with the tube without employing slides and gates in the molding process. This latter configuration significantly simplifies the manufacturing of the tube.

It will be appreciated that the geometry and position of the various inwardly protruding ribs 66, 166, 261, 265, 266, 361 and 461 may vary. The purpose of the ribs is to provide a stable engagement of the fastener having a minimal diameter and to allow the tube to expand or flex outwardly (radially) for larger diameter fasteners while still providing a tight semiquasi-force fit relationship between the fastener and the tube so that during installation, both are essentially axially aligned about the central axis of the fastener and the tube.

Figure 20:
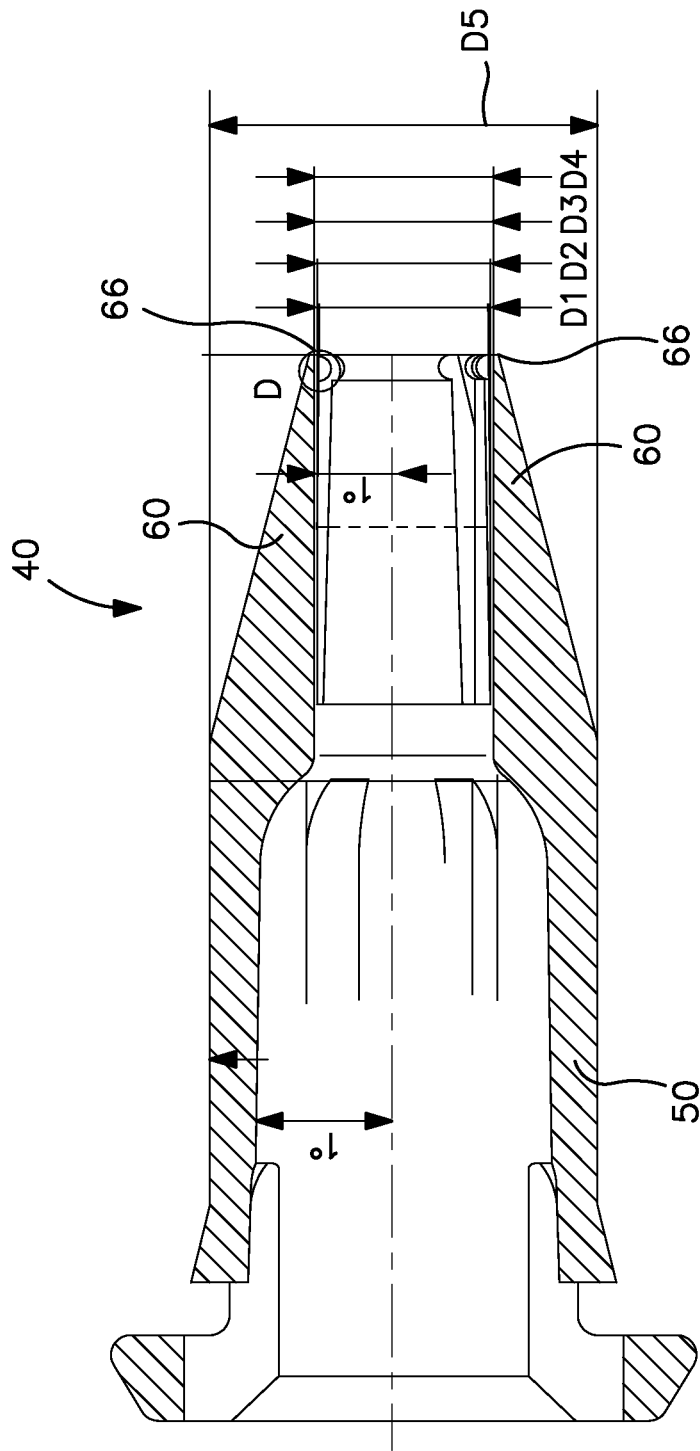
FIG. 20 is a central sectional view, partly in diagram form, of the tube of FIG. 5.
Figure 21:
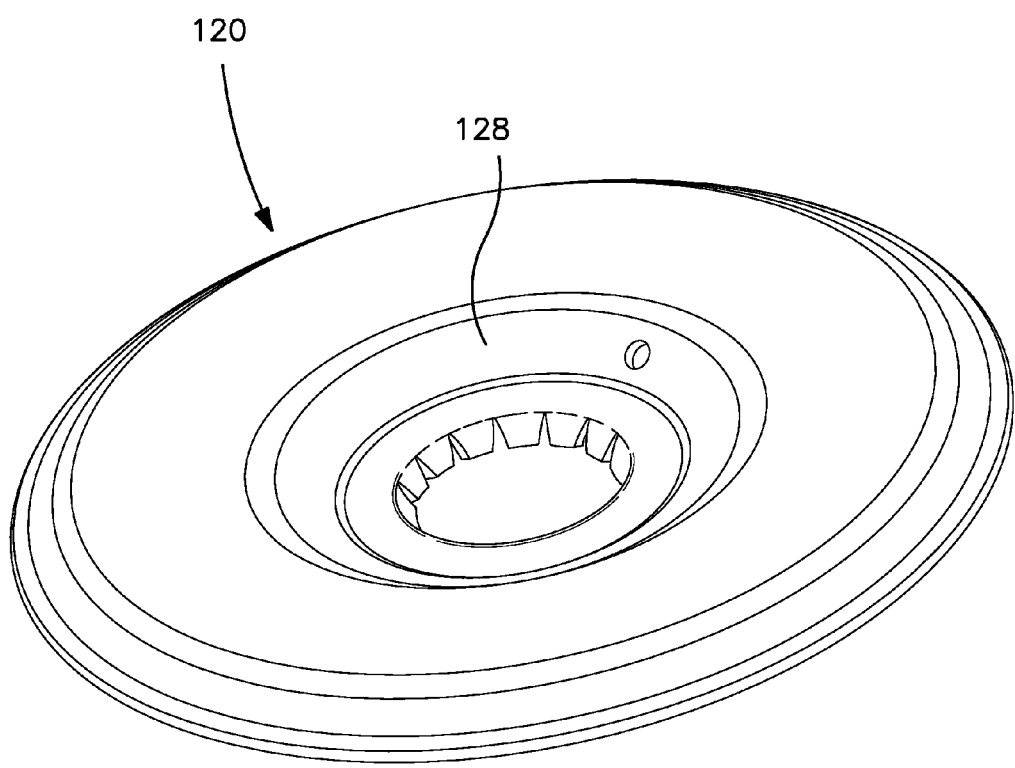
FIG. 21 is a perspective view of an alternative embodiment of a plate which may be employed in a fastening assembly.
Figure 22:
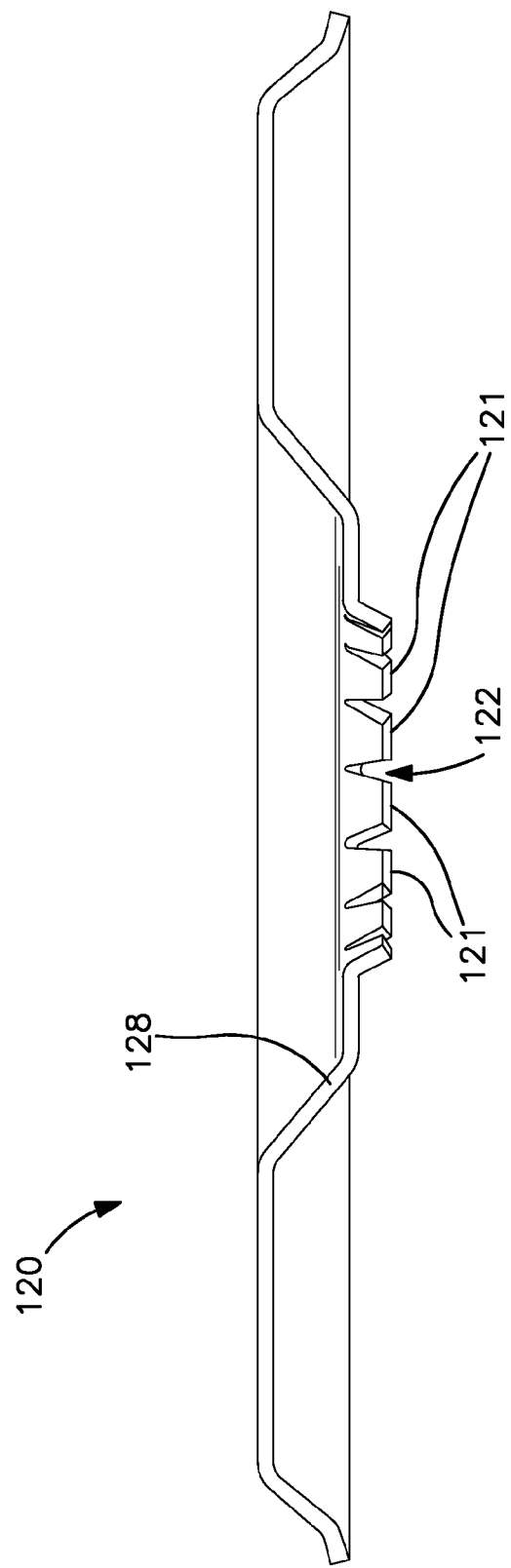
FIG. 22 is a sectional view of the plate of FIG. 21.

With reference to FIG. 20, the tube employs inwardly protruding arcuate ribs structures inwardly adjacent the opening at the terminus of the tapered portion. As illustrated in the drawings, the tapered portions 60 may flex to accommodate fasteners of different diameters such as, for example, fasteners having 0.265, 0.274, 0.283, 0.288 inch diameters D1, D2, D3 and D4. Diameter D5 is slightly less than diameter D6 (FIG. 17) of the plate 20. There is a slight taper, for example, of 1° at the interior upper portions of the throat portion 50 as well as at the terminal inner surface of the terminal tapered portion 60. Naturally, other dimensions are also possible.

Upon installation, the tube 40 is inserted into the opening and a fastener 30 is inserted into the tube. The end of the fastener may project through the opening 70. The foregoing components may be pre-assembled (typically loosely) prior to delivery to the installation site. The plate/tube/fastener is then positioned over the insulation, and in some installations, the membrane, at a pre-established anchoring location. It should be appreciated that for some installations, such as, for example, those that employ the OMG RhinoBond® system, the membrane is placed over the plates and bonded to the plate by heat activated adhesive. The tube penetrates the insulation and, in some installations, the membrane. The driving tool is coupled to the head 32 and the fastener torqued until the thread 36 engages into the roof deck 16 at a pre-established penetration depth. The underside of the fastener head engages the shoulder in the tube. The tabs 54 engage the underside of the plate. Downward displacement of the tube under the securement load of the fastener results in downward displacement of the plate until the proper securement by the fastener is attained. It will be appreciated that the insulation and overlying membrane are compressed or clamped between the plate and the roof deck for securing same.

Figure 23:
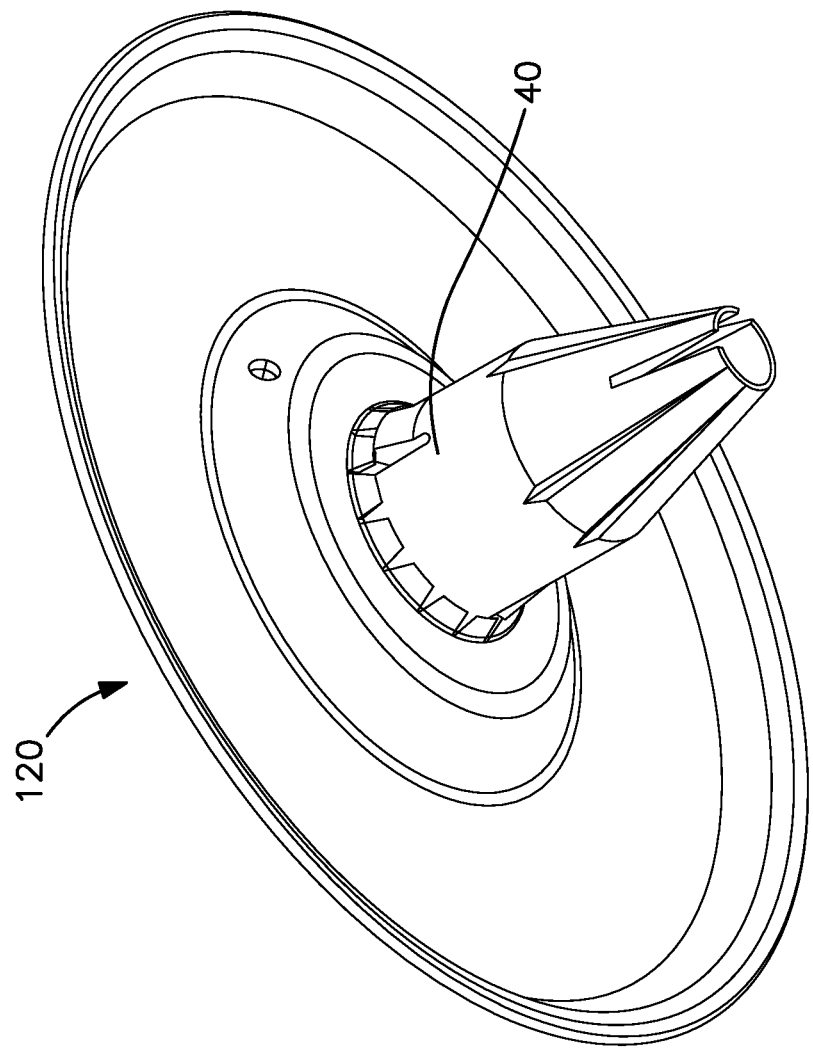
FIG. 23 is a bottom perspective view of the plate of 21 assembled with a tube as employed for the fastening assembly.
Figure 24:
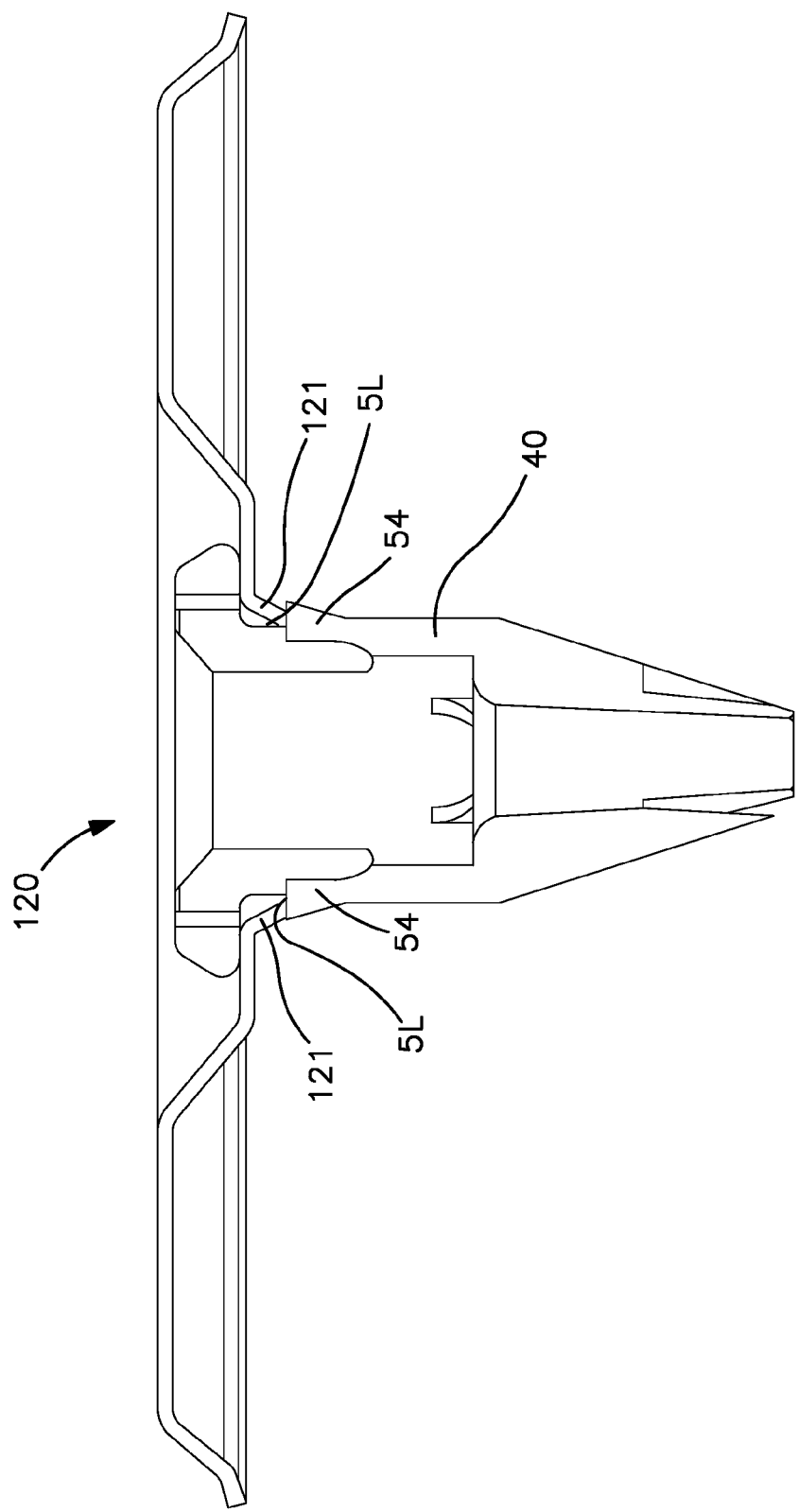
FIG. 24 is a sectional view of the assembled plate and tube of FIG. 23.

With reference to FIGS. 21-24, an alternate embodiment of a plate which may be employed with respect to the connection with the fastening assembly is generally designated by the numeral 120. The plate includes a plurality of angularly spaced, generally trapezoidal prongs 121 which project downwardly and inwardly from the inner stepped recess 128 which surrounds the opening 122. The prongs 121 resiliently engage against the upper underside portion of the tube 40, as best illustrated in FIG. 23. In addition, opposed prongs also engage the shoulders 56 of the resilient tabs 54, as best illustrated in FIG. 24.

It should be appreciated that the configuration of the tube and the assembled relationship between the plate, the tube and the fastener cooperate to normalize the fracture area per unit of load carrying area of the tube between the conical transition and the flange transition. This latter relationship is implemented so that tensile stresses applied to the fastener system are applied along the length of the tube and any tensile failure would ultimately occur, if at all, at the strongest failure resistant structure.

The foregoing installation process is replicated for numerous fastening assemblies as required to properly secure the membrane and insulation.

For applications wherein an additional membrane is mounted over the plates and membranes, and the plates include a heat-activated adhesive, an induction tool (not illustrated) may be used to activate the adhesive and seal and secure the upper membrane to the plates.

If an excessive pressure is applied to the plate or adjacent the plate to compress the insulation so that the spacing between the plate and the deck is decreased, the tube is forced downwardly and slides along the shaft of the fastener. The head of the fastener remains fixed relative to the deck. Upon removal of the compressive load, the assembly resumes normal clamp engagement with the tube and the plate.

A heavy driller (not illustrated) for steel purlin applications is preferably employed for driving the fastener. One single tube 40 as described may provide a friction fit with multiple dimensional fasteners which may be either a #15 RoofGrip™ screw or an OMG Purlin Fastener screw, or a 14 HX or HD screw with a buttress thread marketed by OMG, Inc. of Agawam, Mass.

While preferred embodiments of the foregoing have been set forth for the purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A tube seatable in a roofing compression plate for receiving a fastener comprising:
   a circumferential retaining flange;
   a sleeve extending from said flange and defining a pair of cutouts each surrounding a resilient tab projecting toward said flange and having a shoulder spaced from the underside of said flange and interiorly forming a throat with an interior annular shoulder adapted for engagement by a fastener head; and
   a tapered portion integrally extending from said sleeve and tapering toward a distal tip, a throughbore extending from said throat and dimensioned for receiving the shank of the fastener, a plurality of angularly spaced slots extending to said tip to permit limited flexure in said tapered portion.

2. The tube of claim 1 wherein said tabs have a peripheral ramp surface.

3. The tube of claim 1 wherein there are three slots.

4. The tube of claim 1 wherein the exterior surface of said tapered portion defines a conical portion defined by a plurality of angularly spaced gussets.

5. The tube of claim 1 wherein there are two diametrically opposed tabs.

6. The tube of claim 1 wherein said sleeve further defines a cutout adjacent each said tab.

7. The tube of claim 1 further comprising a plurality of ribs projecting inwardly into said throughbore at said tip.

8. The tube of claim 7 wherein said ribs project inwardly and extend outwardly at said tip.

9. The tube of claim 1 further comprising a plurality of angularly spaced ribs extending longitudinally interiorly of said sleeve.

10. The tube of claim 1 further comprising a recess defined at an interior location adjacent the intersection of said throat and said tapered portion.

11. The tube of claim 1 wherein said tube is manufactured from a plastic material.

12. A roof installation comprising:
    a roof deck;
    insulation disposed on said roof deck;
    a membrane overlying said insulation;
    a compression plate defining a central opening and disposed on an upper surface of said membrane;
    a clamp tube having a retainer collar, a throat and a tapered portion with a fastener opening; and
    a fastener comprising a drive head and a threaded shank having an unthreaded portion and a threaded portion extending from said drive head, said fastener shank extending through said central opening and engaged with said deck wherein said unthreaded portion extends through and beyond said fastener opening so that said retainer collar engages said plate and said tube is captured by said plate, and said tube and plate are displaceable as a unit from a first position under a compressive load and returned to said first position as a unit when said compressive load is removed wherein the clamp tube slides along said unthreaded portion while the fastener remains engaged with the deck.

13. The roof installation of claim 12 wherein said plate has an underside which engages said membrane and said clamp tube further comprises a pair of opposed retainer tabs for engaging the underside of said plate.

14. The roof installation of claim 12 wherein said tapered portion is traversed by a plurality of angularly disposed slots.

15. The roof installation of claim 12 further comprising a shoulder defined at an interior location of the tube adjacent the intersection of said throat and said tapered portion, said fastener head being seated against said shoulder.

16. The roof installation of claim 12 wherein said compression plate further comprises a recessed portion surrounding said central opening and said retainer collar is received in said recessed portion.

17. A fastening assembly for securing a membrane and insulation to a roof deck comprising:
    a fastener comprising a drive head and a threaded shank extending from said drive head and comprising an unthreaded portion and a threaded portion;
    a compression plate for distributing the load of said fastener across an upper surface and defining a central opening and comprising a plurality of angularly spaced prongs surrounding said central opening;
    a clamp tube comprising a pair of opposed tabs and having a retainer collar, a throat and a tapered portion with a fastener opening through which said shank projects, said fastener shank being inserted through said central opening so that said retainer collar engages said plate and is captured thereby and said unthreaded portion is disposed in said central opening and extends beyond said fastener opening wherein said clamp tube is slidable along said unthreaded portion and at least one of said prongs surround and resiliently engage against the throat at a peripheral exterior portion adjacent said retainer collar and at least two prongs engage against said tabs.

18. A tube seatable in a roofing compression plate for receiving a fastener comprising:
    a circumferential retaining flange;
    a sleeve extending from said flange and having a pair of tabs with shoulders spaced from the underside of said flange and interiorly forming a throat with an interior annular shoulder adapted for engagement by a fastener head; and a tapered portion integrally extending from said sleeve and tapering toward a distal tip, a throughbore extending from said throat and dimensioned for receiving the shank of a fastener and comprising a plurality of ribs projecting into said throughbore at said tip, a plurality of angularly spaced slots extending to said tip to permit limited flexure in said tapered position.

* * * * *